US010866377B2

(12) United States Patent
Claessens et al.

(10) Patent No.: US 10,866,377 B2
(45) Date of Patent: *Dec. 15, 2020

(54) SPLITTER MODULE AND ENCLOSURE FOR USE THEREIN

(71) Applicant: CommScope Connectivity Belgium BVBA, Kessel-Lo (BE)

(72) Inventors: Bart Mattie Claessens, Hasselt (BE); Dirk Kempeneers, Aarschot (BE); Erwin Beckers, Werchter (BE); Peter Claes, Berlaar (BE); Emilie De Groe, Kessel-Lo (BE); Ronnie Rosa Georges Liefsoens, Tessenderlo (BE); Roel Modest Willy Bryon, Aarschot (BE); Thierry Janssens, Kessel-Lo (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,296

(22) Filed: Jul. 18, 2019

(65) Prior Publication Data

US 2019/0391351 A1 Dec. 26, 2019

Related U.S. Application Data

(63) Continuation of application No. 15/760,860, filed as application No. PCT/EP2016/072026 on Sep. 16, 2016, now Pat. No. 10,371,913.

(Continued)

(51) Int. Cl.
*G02B 6/44* (2006.01)
*G02B 6/38* (2006.01)

(52) U.S. Cl.
CPC ........... *G02B 6/445* (2013.01); *G02B 6/3897* (2013.01); *G02B 6/4446* (2013.01); *G02B 6/4447* (2013.01); *G02B 6/4454* (2013.01)

(58) Field of Classification Search
None
See application file for complete search history.

(56) References Cited

U.S. PATENT DOCUMENTS

| 10,371,913 B2* | 8/2019 | Claessens ............ G02B 6/4446 |
| 2011/0013875 A1* | 1/2011 | Bran de Leon ........ G02B 6/445 |
| | | 385/135 |

(Continued)

FOREIGN PATENT DOCUMENTS

| WO | 2015/025060 A1 | 2/2015 |
| WO | 2015/144397 A1 | 10/2015 |
| WO | 2015/150204 A2 | 10/2015 |

OTHER PUBLICATIONS

International Search Report and Written Opinion of the International Searching Authority for corresponding International Patent Application No. PCT/EP2016/072026 dated Dec. 1, 2016, 11 pages.

*Primary Examiner* — Chad H Smith
(74) *Attorney, Agent, or Firm* — Merchant & Gould P.C.

(57) ABSTRACT

An enclosure (10) includes a base (38) defining a splice region (148) and a cover (40) coupled to the base (38) to move between a closed position and an open position. A plurality of ruggedized adapters (26) are on the cover (40), each adapter having an inner port (64) and an outer port (66). A removable module (32) is disposed on the cover (40), at least one input fiber (12) being routed from the splice region (148) of the base (38) to the removable module (32), wherein the at least one input fiber (12) is output from the module as a pigtail (28) having a connectorized end that is connected to an inner port (64) of a ruggedized adapter (26). A cable input location (16) receives an input cable (14/20) including at least one tube (138) surrounding at least one fiber (12) that carries the same signal as the at least one input fiber (12) being routed from the splice region (148) to the removable module (32). The input cable (14/20) is anchored (Continued)

to the base (38) at the cable input location (16). A tube holder (150) is slidably mounted to the base (38) past the cable input location (16), wherein the tube holder (150) keeps separate an unused fiber-carrying tube (138) that is stored within the base (38) in a loop (122) from a fiber-carrying tube (138) whose fiber (12) leads toward the splice region (148) of the base (38) for further routing toward the removable module (32).

20 Claims, 27 Drawing Sheets

Related U.S. Application Data

(60) Provisional application No. 62/219,420, filed on Sep. 16, 2015.

(56) References Cited

U.S. PATENT DOCUMENTS

| | | |
|---|---|---|
| 2011/0026894 A1 | 2/2011 | Rudenick et al. |
| 2011/0097050 A1 | 4/2011 | Blackwell, Jr. et al. |
| 2015/0093090 A1 | 4/2015 | Aznag et al. |

\* cited by examiner

SPLITTER MODULE AND ENCLOSURE FOR USE THEREIN

CROSS-REFERENCE TO RELATED APPLICATION

This application is a Continuation of U.S. patent application Ser. No. 15/760,860, filed on Mar. 16, 2018, now U.S. Pat. No. 10,371,913, which is a National Stage Application of PCT/EP2016/072026, filed on Sep. 16, 2016, which claims the benefit of U.S. Patent Application Ser. No. 62/219,420, filed on Sep. 16, 2015, the disclosures of which are incorporated herein by reference in their entireties. To the extent appropriate, a claim of priority is made to each of the above disclosed applications.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

As demand for telecommunications increases, optical fiber services are being extended in more and more areas. To more efficiently extend the fiber optic service into areas where current and future customers are located, telecommunications enclosures are integrated throughout the network of telecommunications cables. Such enclosures provide connection locations where one or more optical fibers of the multi-fiber cable may be connected to end users/subscribers. Also, the enclosures are adapted to house and protect telecommunications components such as splices, termination panels, power splitters, and wavelength division multiplexers.

Improvements are desired.

SUMMARY

In accordance with other aspects of the disclosure, a telecommunications enclosure includes a base defining a splice region; and a cover coupled to the base to move between a closed position and an open position. The cover and the base cooperate to define an interior when the cover is in the closed position. The cover provides access to the interior when in the open position. Ruggedized adapters are disposed on the cover. Each ruggedized adapter has a first port accessible from an inner side of the cover and a second port accessible from an outer side of the cover. Modular elements such as splitter modules may be disposed at the inner side of the cover. Each splitter module may include an optical device in the form of a splitter disposed therein. An input fiber may be coupled to one end of the splitter, and a plurality of connectorized splitter output pigtails may be coupled to another end the splitter, the output pigtails leading to the ruggedized adapters on the cover. The input fiber is routed from the splice region of the base. In certain examples, the cover defines at least one pocket at the inner side. The modular elements such as the splitter modules are disposed in the pocket(s). In one example, the ruggedized adapters are disposed on the cover in a first row and a second row, and the pocket is defined between the first row and the second row of adapters. In certain examples, a second splitter module is carried by the cover. The second splitter module may extend parallel to the first splitter module. The ruggedized adapters and the splitter modules may be angled relative to the cover.

According to another aspect of the disclosure, the base of the enclosure may define an anchor location at which an input cable (e.g., a feeder cable, a branch cable, etc.) can be anchored. The enclosure also includes a gasket disposed at the base to enable ingress of the input cable and to inhibit ingress of contaminants. The cover is configured to cooperate with the base to activate the gasket.

The input fiber from the splice region of the base is routed to a splitter module on the cover.

In accordance with other aspects of the disclosure, a method of connecting a feeder fiber to a plurality of output fibers includes: routing the feeder fiber into an enclosure having a base and a cover; routing the feeder fiber to a splice region defined at an inner side of the base; mounting a splitter module to an inner side of the cover; routing an input fiber of the splitter module from the splice region; and plugging connectorized ends of splitter output pigtails from the splitter module into inner ports of ruggedized adapters on the cover. The splitter module(s), the ruggedized adapters, and the splitter output pigtails may all be carried together by the cover.

In certain examples, the method also includes splicing the feeder fiber to the input fiber at the splice region, wherein the input fiber is routed to the splitter module.

In certain examples, the method also includes activating a sealing arrangement by moving the cover relative to the base to a closed position to limit ingress of contaminants.

According to another aspect, the disclosure is directed to an enclosure comprising a base defining a splice region, a cover coupled to the base to move between a closed position and an open position, the cover and the base cooperating to define an interior when the cover is in the closed position, the cover providing access to the interior when in the open position, a plurality of ruggedized adapters disposed on the cover, each ruggedized adapter having an inner port accessible from an inner side of the cover and an outer port accessible from an outer side of the cover, a removable module disposed at the inner side of the cover, at least one input fiber being routed from the splice region of the base to the removable module, wherein the at least one input fiber is output from the module as a pigtail having a connectorized end that is connected to an inner port of one of the ruggedized adapters, a cable input location for receiving an input cable that includes at least one tube surrounding at least one fiber that carries the same signal as the at least one input fiber being routed from the splice region to the removable module, the input cable being anchored to the base at the cable input location, and a tube holder that is slidably mounted to the base past the cable input location, the tube holder configured to keep separate an unused fiber-carrying tube that is stored within the base in a loop from a fiber-carrying tube whose fiber leads toward the splice region of the base for further routing toward the removable module.

According to another aspect, the disclosure is directed to a method of connecting a fiber of an input cable entering a telecommunications enclosure to a drop fiber exiting the enclosure, the method comprising routing the input cable into the enclosure having a base and a pivotable cover, separating a tube of the input cable that carries a fiber to be processed within the enclosure from unused tubes of the input cable using a slidably movable tube holder, storing the unused tubes of the input cable in a loop within the enclosure, routing the fiber to a splice tray carried by the base, splicing the fiber to a second fiber within the splice tray and routing the second fiber to a removable module that is positioned within an interior side of the cover, outputting the second fiber from the removable module as a connectorized pigtail, and plugging a connectorized end of the pigtail to the drop fiber via a ruggedized adapter carried by the cover.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
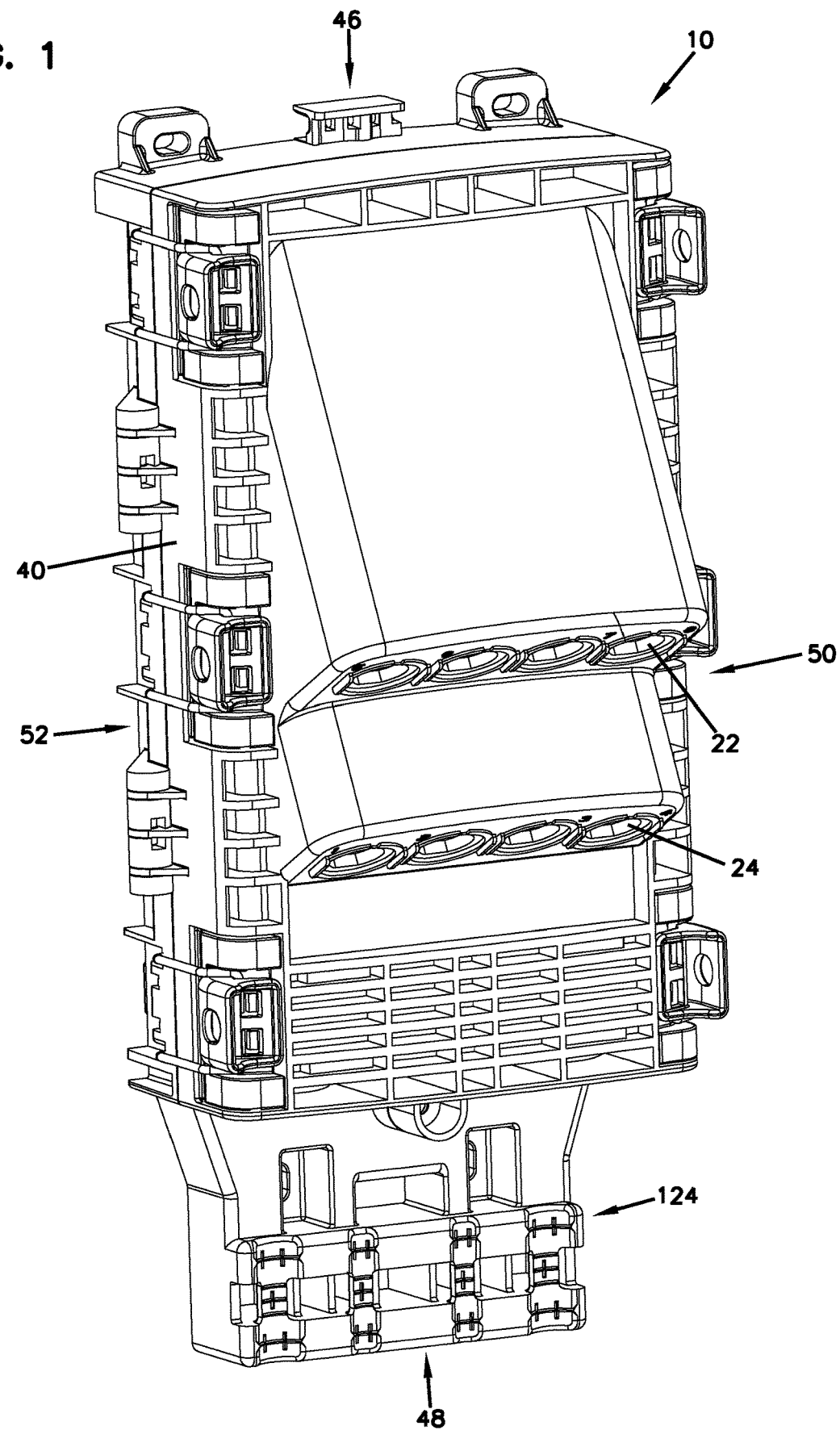
FIG. 1 is a top, front, left side perspective view of a telecommunications enclosure having features that are examples of inventive aspects in accordance with the principles of the present disclosure.
Figure 2:
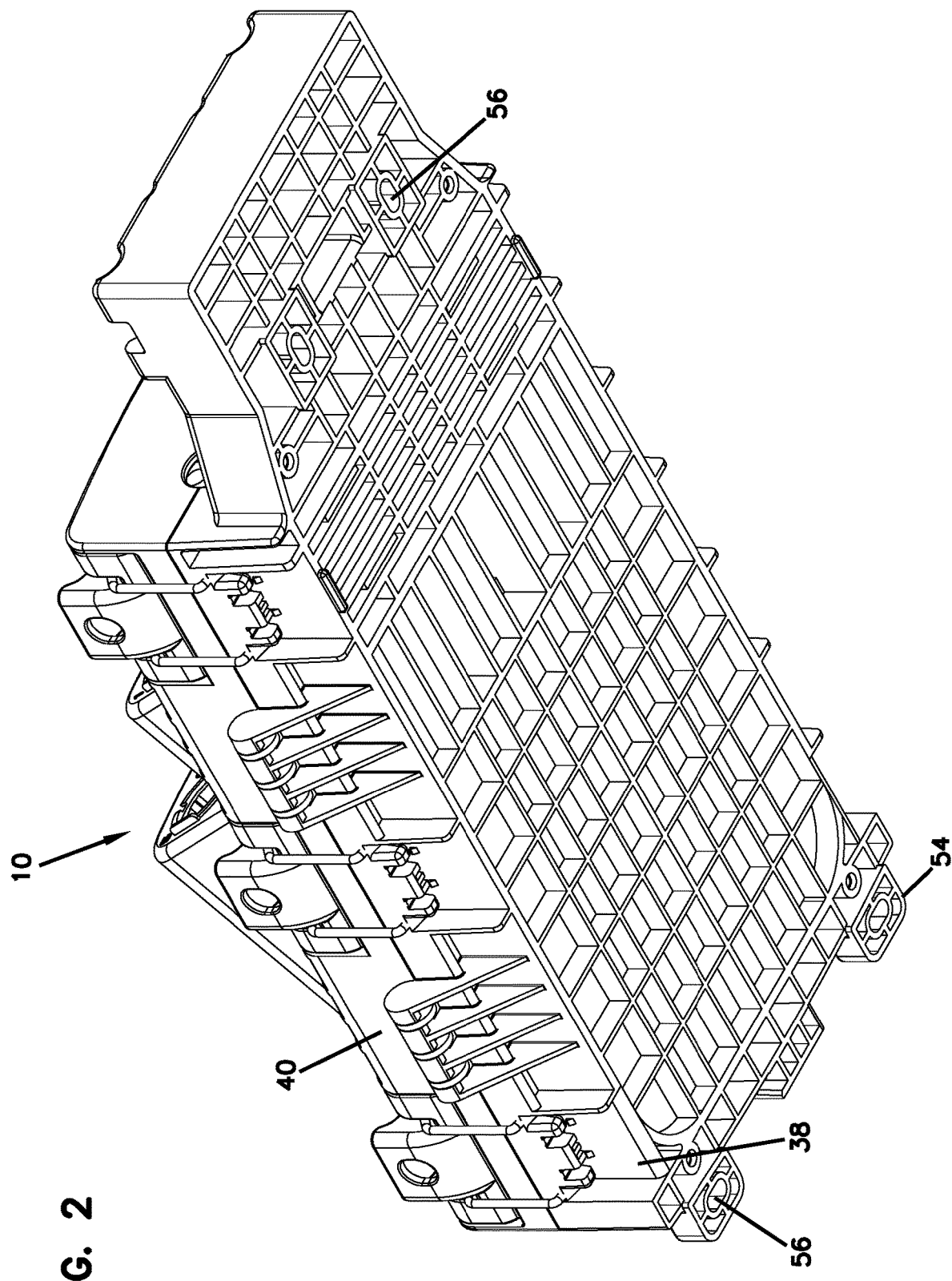
FIG. 2 is a bottom, rear, left side perspective view of the enclosure of FIG. 1.
Figure 3:
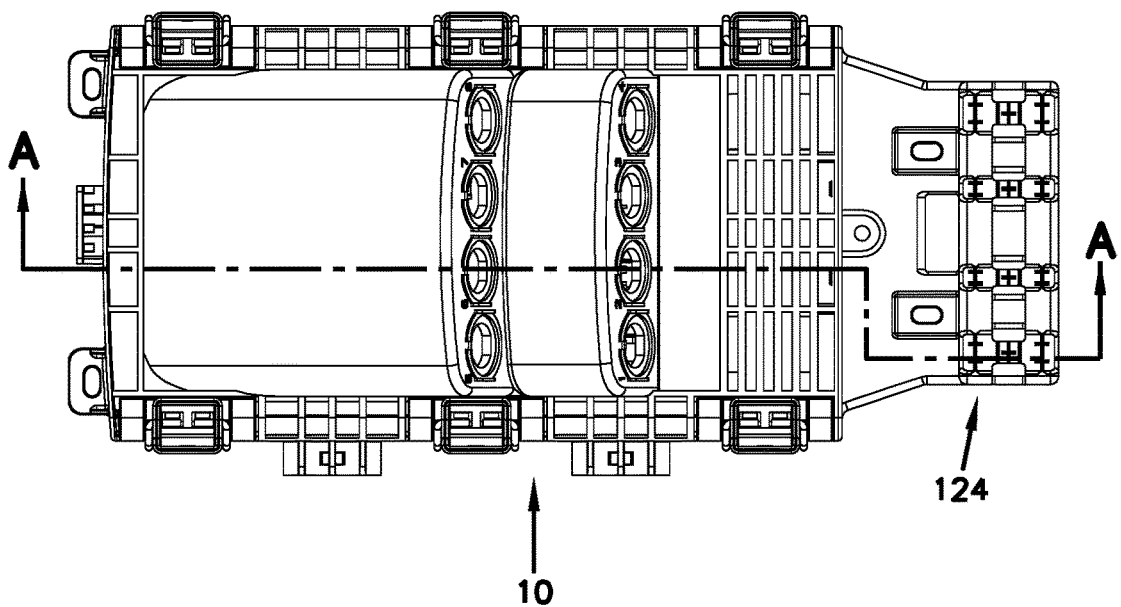
FIG. 3 is a front view of the enclosure of FIG. 1.
Figure 4:
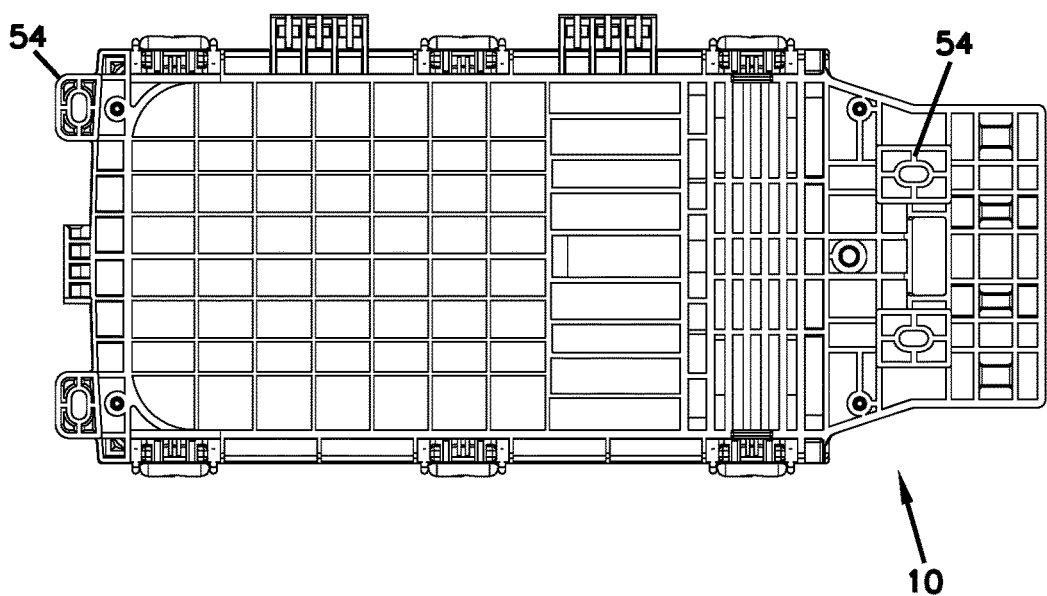
FIG. 4 is a rear view of the enclosure of FIG. 1.
Figure 5:
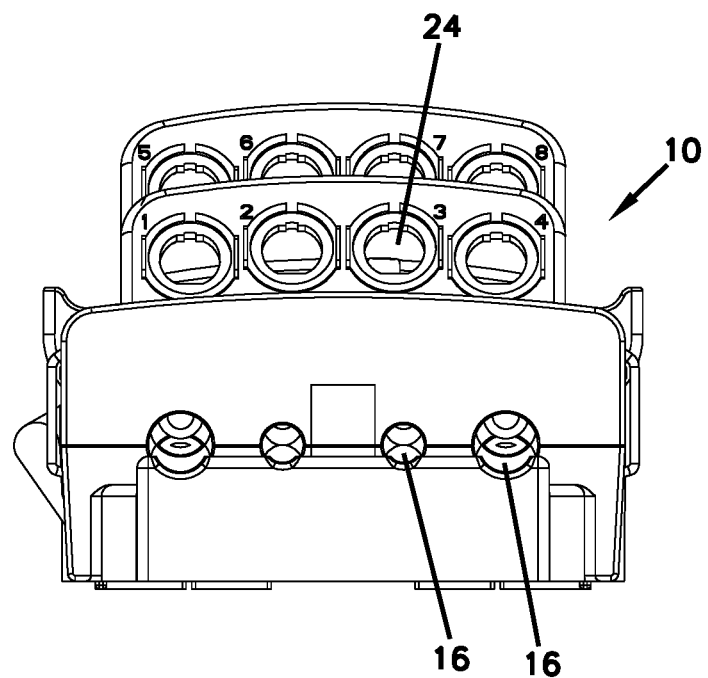
FIG. 5 is a bottom view of the enclosure of FIG. 1.
Figure 6:
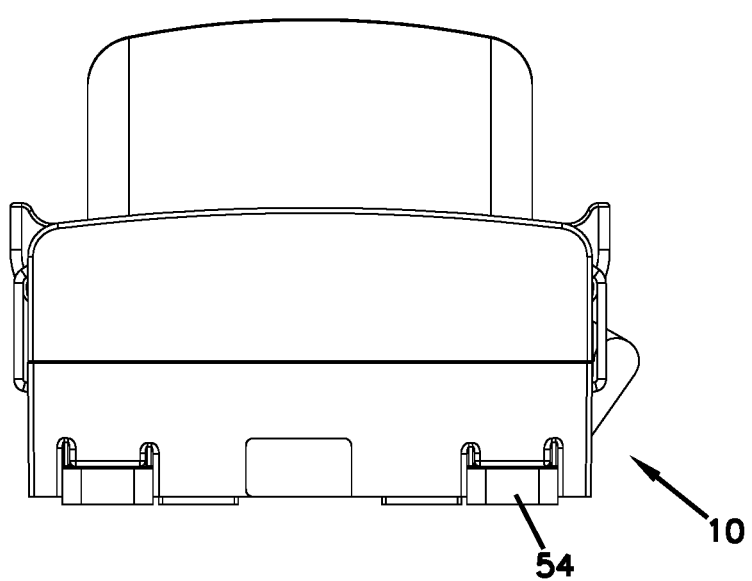
FIG. 6 is a top view of the enclosure of FIG. 1.
Figure 7:
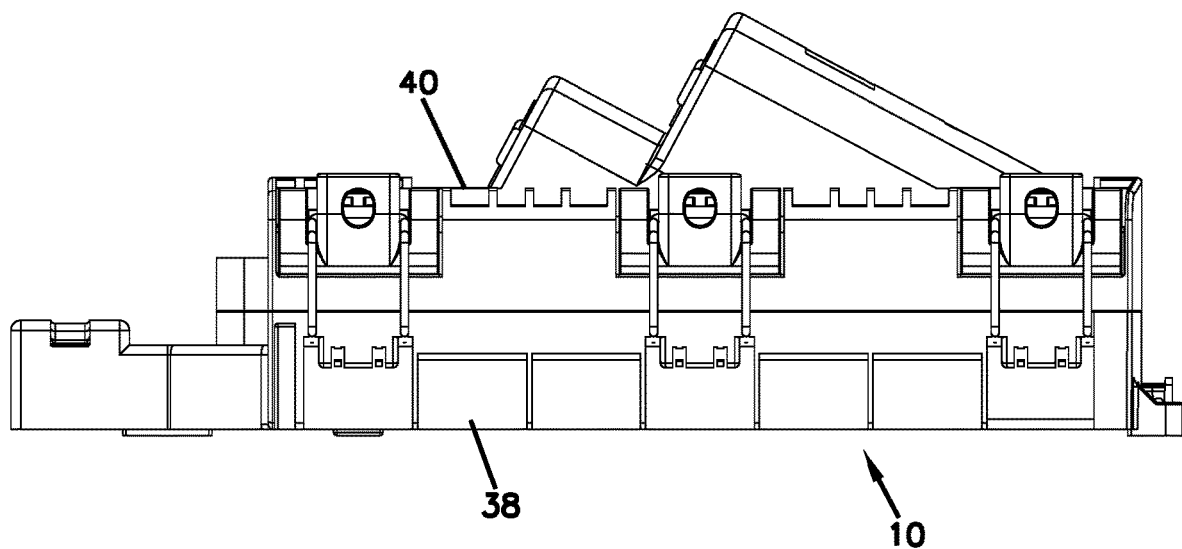
FIG. 7 is a right side view of the enclosure of FIG. 1.
Figure 8:
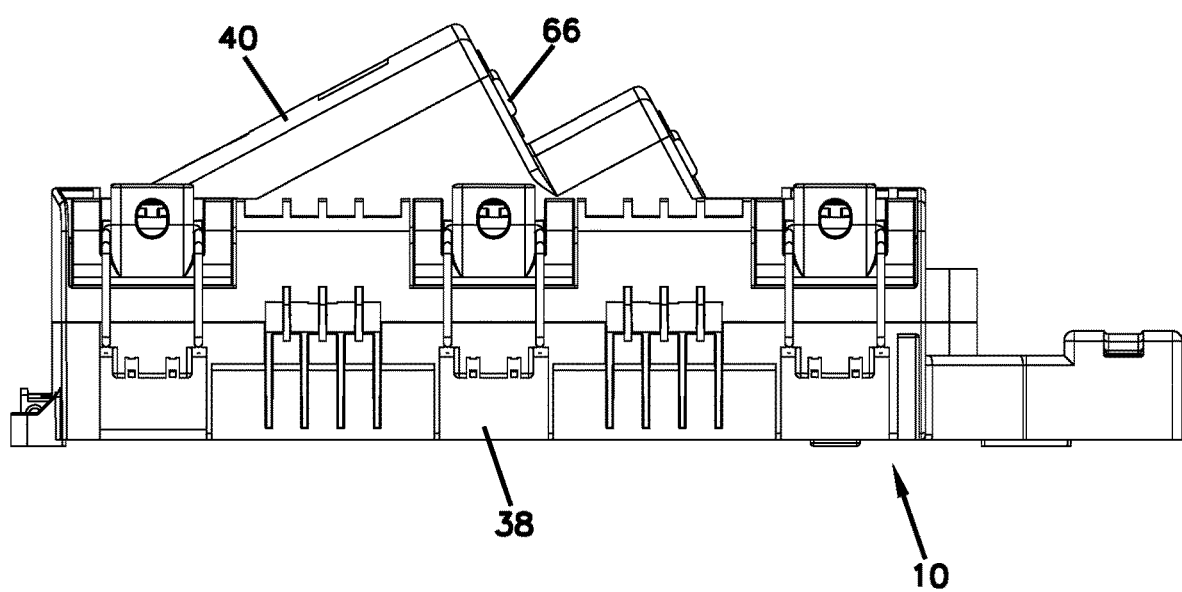
FIG. 8 is a left side view of the enclosure of FIG. 1.
Figure 9:
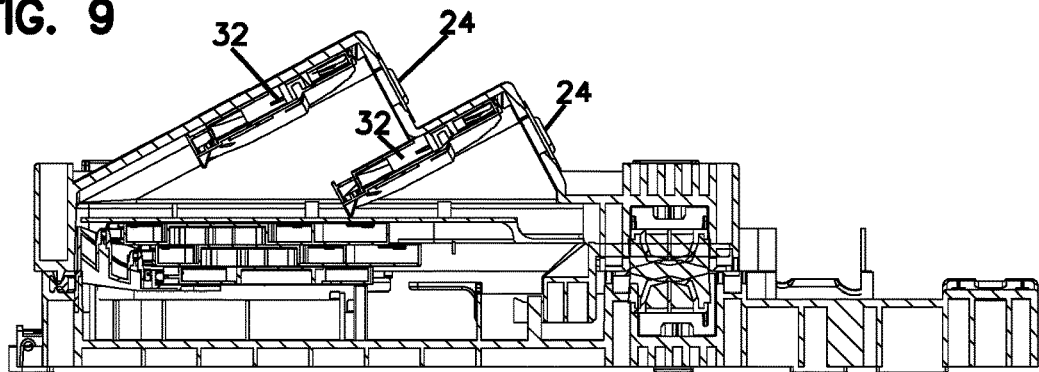
FIG. 9 is a left side cross-sectional view taken along line A-A of FIG. 3.
Figure 10:
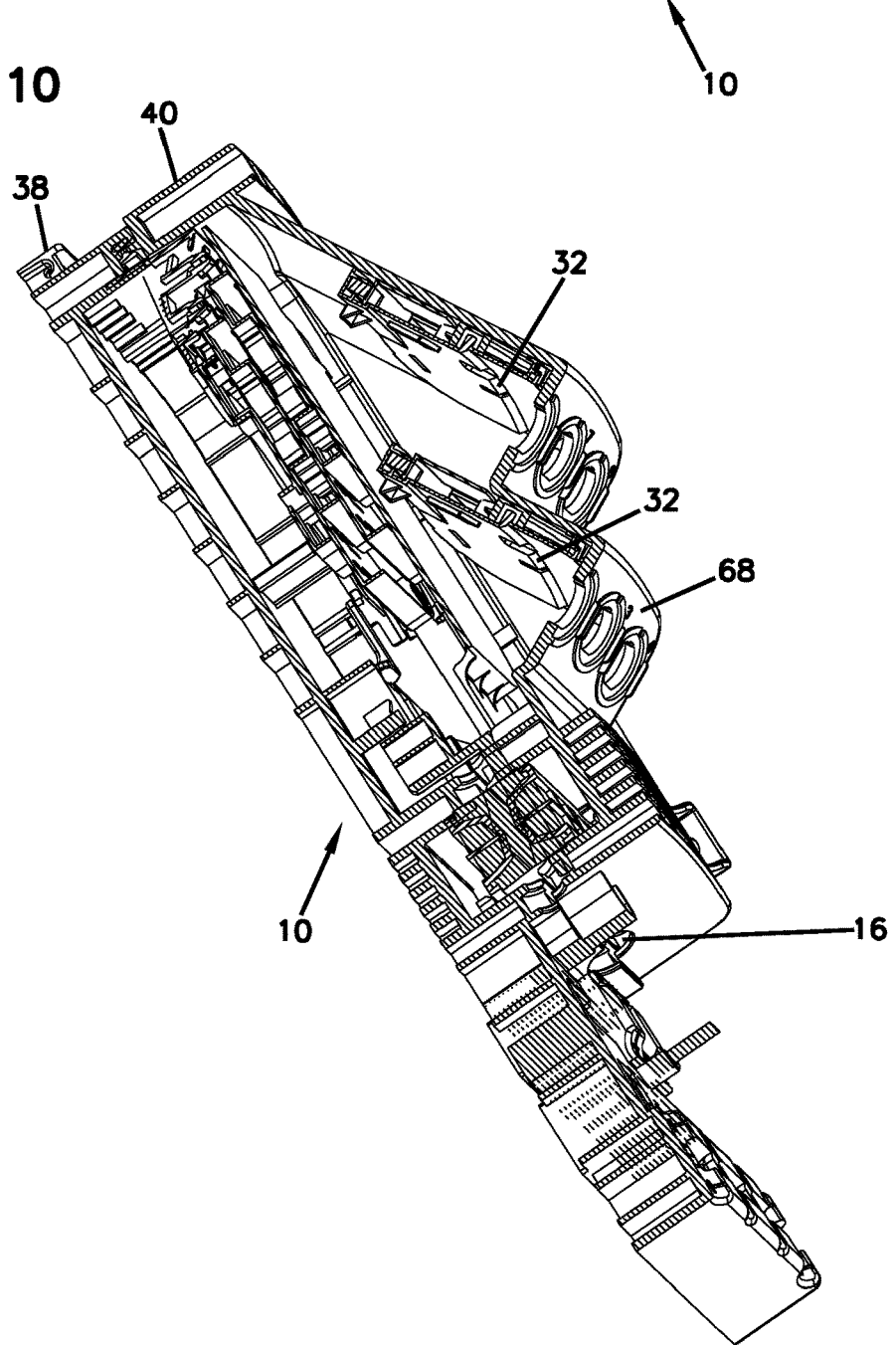
FIG. 10 is a left side perspective cross-sectional view taken along line A-A of FIG. 3.
Figure 11:
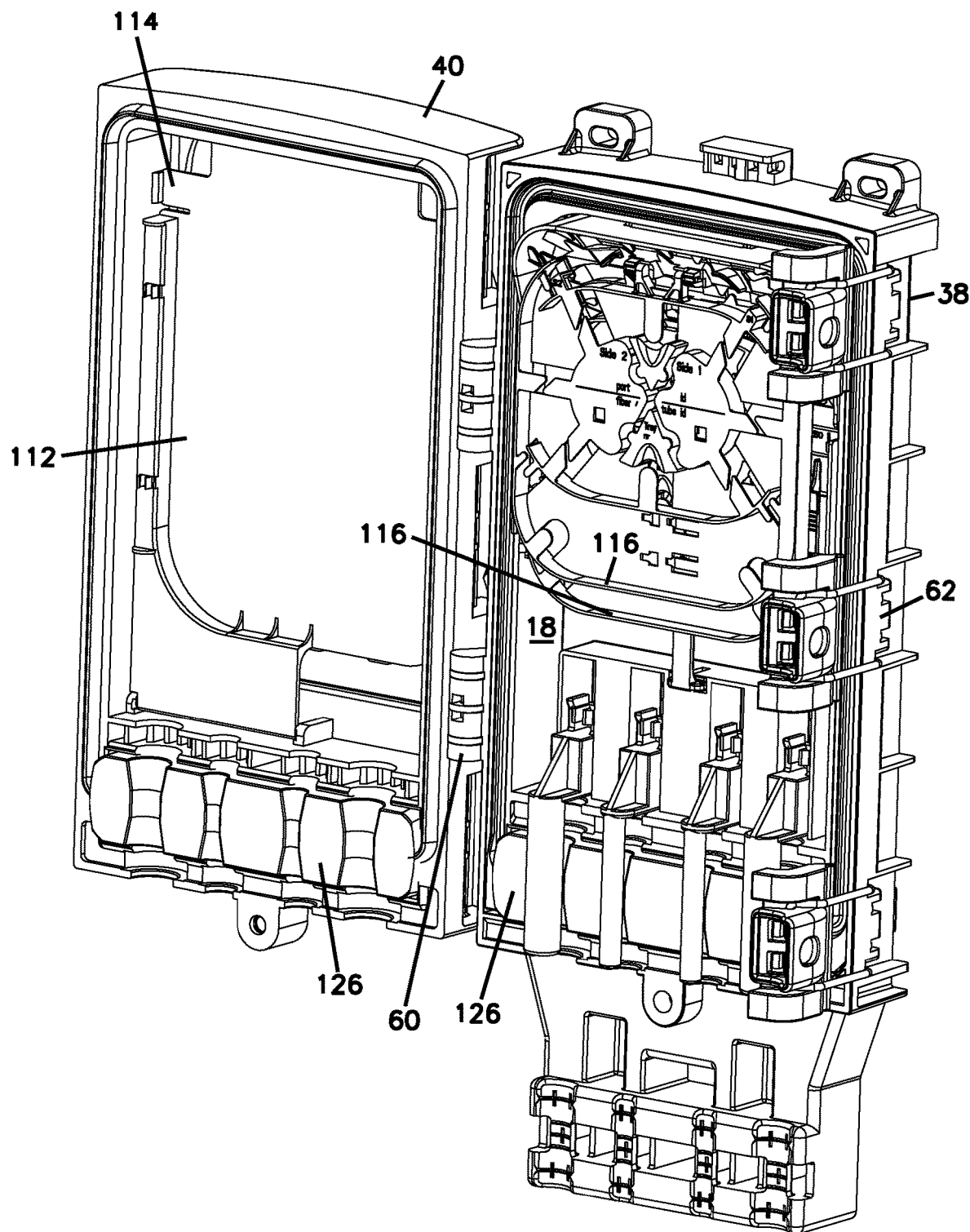
FIG. 11 is a right side perspective view of the enclosure of FIG. 1 shown with the cover of the enclosure in the open position.
Figure 12:
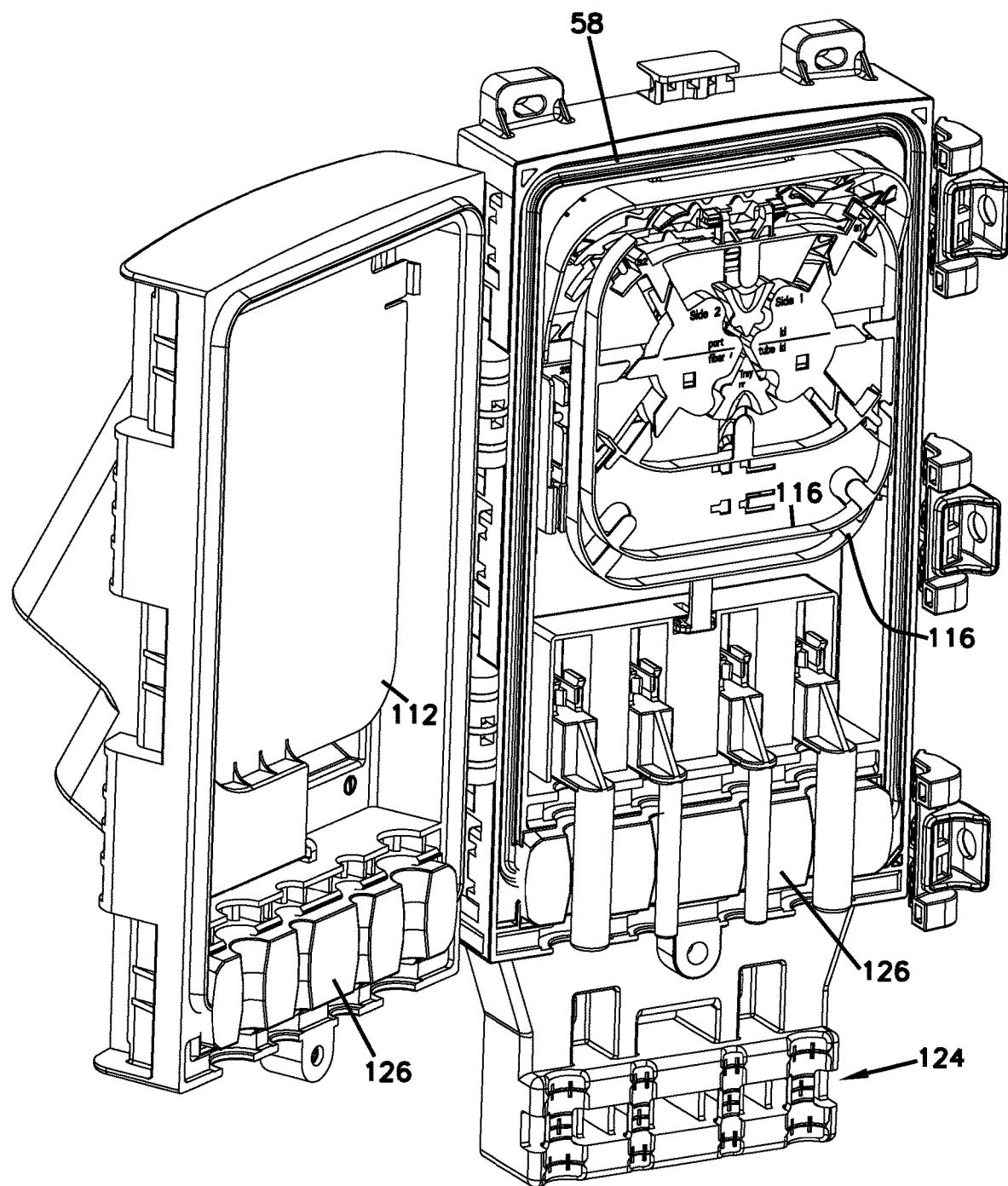
FIG. 12 is a left side perspective view of the enclosure of FIG. 11.
Figure 13:
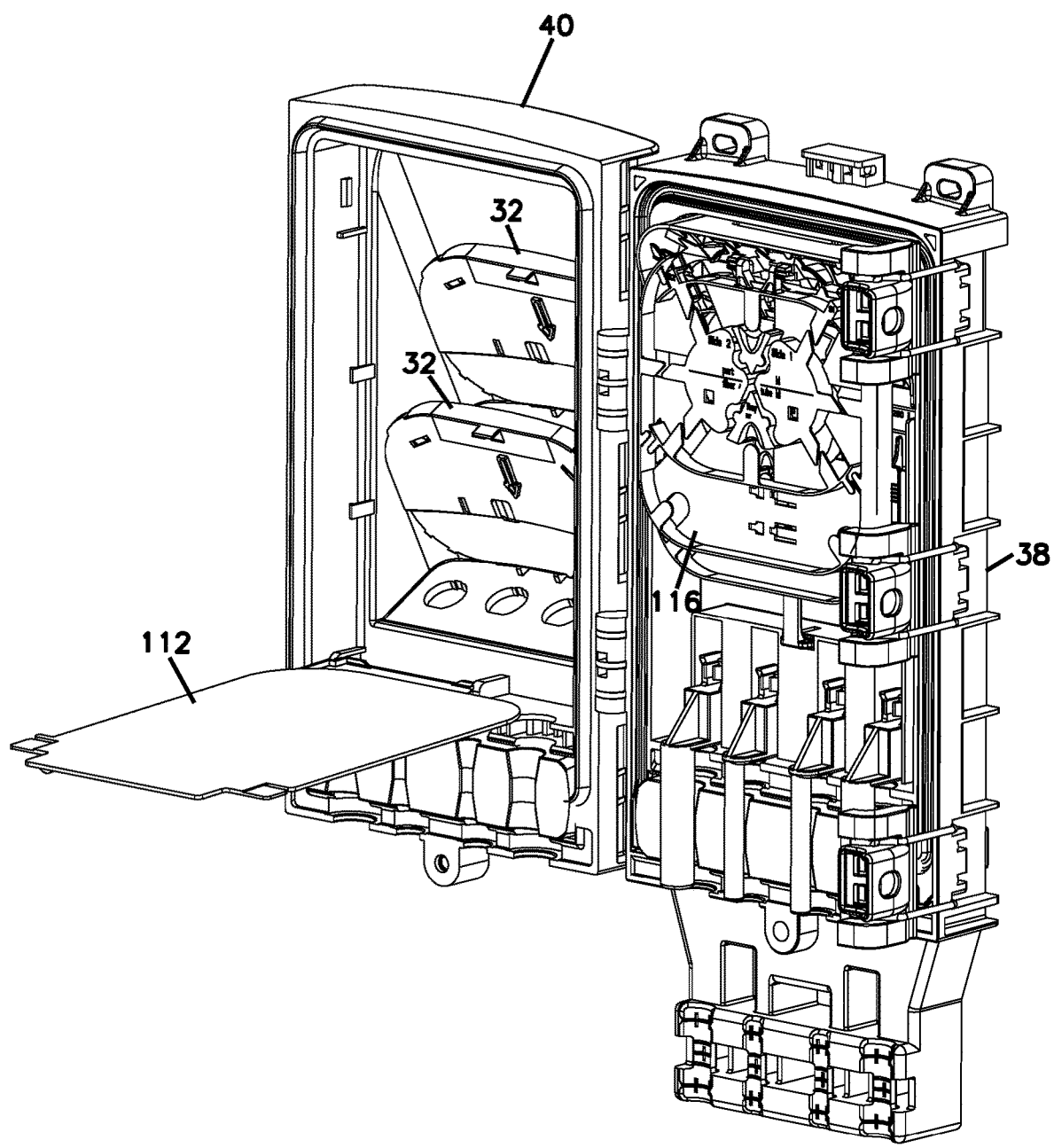
FIG. 13 illustrates the enclosure of FIG. 11 with the splitter module protection cover in the open position.

Reference will now be made in detail to exemplary aspects of the present disclosure that are illustrated in the accompanying drawings. Wherever possible, the same reference numbers will be used throughout the drawings to refer to the same or like parts.

In general, the disclosure relates to a telecommunications enclosure and modular elements mounted within the enclosure, wherein the modular elements may be used for signal splitting/processing.

FIGS. 1-20 illustrate an example enclosure 10 in accordance with the principles of the present disclosure. The enclosure 10 is generally configured to be mounted to a vertical structure such as a wall or a telecommunications poll. The enclosure 10 is generally configured to connect at least one feeder fiber 12 (e.g., carried by a feeder cable 14 entering the enclosure 10) to at least two drop fibers exiting the enclosure 10. According to one example, the feeder fiber 12 may be a 250-micron fiber.

As shown in FIGS. 1-20, the example enclosure 10 defines one or more input ports 16 leading to an interior 18 of the enclosure 10. In one example, the enclosure 10 includes at least two input ports 16 for looping the feeder cable 14 within the enclosure 10. In the given example, the enclosure 10 includes four input ports 16, wherein the two outer input ports 16 may be used for looping a feeder cable 14 and the two middle input ports 16 may be used for looping a branch cable 20 as will be discussed in further detail below.

The outputs 22 of the enclosure 10 are defined by ports 24 (eight in the given example) that can be populated with optical adapters 26 (e.g., ruggedized adapters) for mating the connectorized fibers 28 coming from within the enclosure 10 to connectorized drop cables leading away from the enclosure 10. The ports 24 output signals that have been processed or split by the optical devices 30 within the enclosure 10. In certain embodiments, the enclosure 10 may be used to support a pass-through arrangement wherein the same number of fibers that enter the enclosure are output from the enclosure 10 without a power split operation. Examples of such arrangements will be discussed in further detail below.

Still referring to FIGS. 1-20, as noted above, the example enclosure 10 may house modular elements in the form of splitter modules 32 that include optical devices 30 in the form of optical splitters 34. The splitter modules 32 may be configured to receive at least one input fiber (continuing the same signal as the feeder fiber 12) and output a plurality of connectorized pigtails 28. Each splitter module 32 defines a housing 36 enclosing the optical splitter 34. Signals carried by the input fiber 12 are split (e.g., power split) onto the output pigtails 28 by the optical splitter 34. Each output pigtail 28 may have a connectorized end that exits the example enclosure 10 via the ruggedized adapters 26 as noted above.

Still referring to FIGS. 1-20, the enclosure 10 defines a base 38 and a cover 40 coupled to the base 38. The enclosure 10 has a front 42, a rear 44, a top 46, a bottom 48, a right side 50, and a left side 52. In the example shown, the base 38 defines the rear 44 of the enclosure 10, and the cover 40 defines the front 42 of the enclosure 10. However, the terms "front," "rear," "top," and "bottom" are not intended to be limited and are used for clarity. The enclosure 10 can be disposed in any desired orientation.

As noted above, the base 38 may be configured to be mounted to a structure (e.g., a wall or other surface). For example, the base 38 can include one or more mounting structures in the form of mounting flanges 54 for mounting to a wall. In the depicted embodiment, the mounting flanges 54 are formed integrally with the base 38 of the enclosure 10, as shown in FIGS. 1-4. When the enclosure 10 needs to be mounted to a surface such as a wall surface, fasteners can be inserted through openings 56 defined on the mounting flanges 54.

If the enclosure 10 needs to be mounted to a vertical surface that has curvature such as a telecommunications pole, a separate bracket may be attached to the base 38, wherein the bracket may include loops for use with straps in tying the enclosure 10 to the pole.

Now referring to FIGS. 11-20, the cover 40 is configured to pivot relative to the base 38 between a closed position and an open position. The cover 40 and the base 38 cooperate to define the interior 18 when the cover 40 is in the closed position. The base 38 and cover 40 also cooperate to activate an enclosure gasket 58 when closed. The enclosure gasket 58 inhibits ingress of contaminants through a seam between the base 38 and the cover 40. User access to the enclosure interior 18 is provided when the cover 40 is in the open position.

To provide the pivoting motion, the base 38 and the cover 40 can include hinge members 60 that cooperate to define a hinge axis. In some implementations, the cover 40 can be locked in the closed position. For example, a clasp arrangement 62 can hold the cover 40 in the closed position relative to the base 38. In other implementations, the cover 40 can be latched relative to the base 38. In still other implementations, a padlock or other type of lock can retain the cover 40 in the closed position.

In some implementations, the optical adapters 26 that are used for outputting the signals from the enclosure 10 may be carried by the cover 40 so that inner ports 64 of the adapters 26 are accessible from an interior side of the cover 40, and outer ports 66 of the adapters 26 are accessible from an exterior side of the cover 40. In certain implementations, the adapters 26 are angled so that the outer ports 66 face towards the input ports 16 of the enclosure 10 (please see FIGS. 1, 3, and 5). For example, the cover 40 can define one or more adapter mounting surfaces 68 and one or more module mounting surfaces 70. The adapter mounting surfaces 68 define the output openings/ports 24. In certain examples, the adapter mounting surfaces 70 are angled towards the input openings 16 of the enclosure 10.

As noted above, in some implementations, the splitter modules 32 that carry the optical splitters 34 may be carried by the cover 40. For example, the inner side of the cover 40 may define one or more pockets 72 for receiving the splitter modules 32, wherein the pockets 72 are bordered on one side by the module mounting surfaces 70. In certain implementations, each pocket 72 is disposed between a row of the output ports 24 and the interior side of the module mounting surface 70. A splitter module 32 may be shaped to fit within the pocket 72.

In some implementations, the cover 40 defines multiple pockets 72 for receiving multiple modules 32. In certain examples, the cover 40 defines a pocket 72 for each row of the optical adapters 26. In the example shown, the cover 40 defines two pockets 72 and two rows of optical adapters 26. One splitter module 32 is disposed at each pocket 72 in the given example. Output pigtails 28 from each splitter module 32 are connected to the adapters 26 in the respective row.

Figure 15:
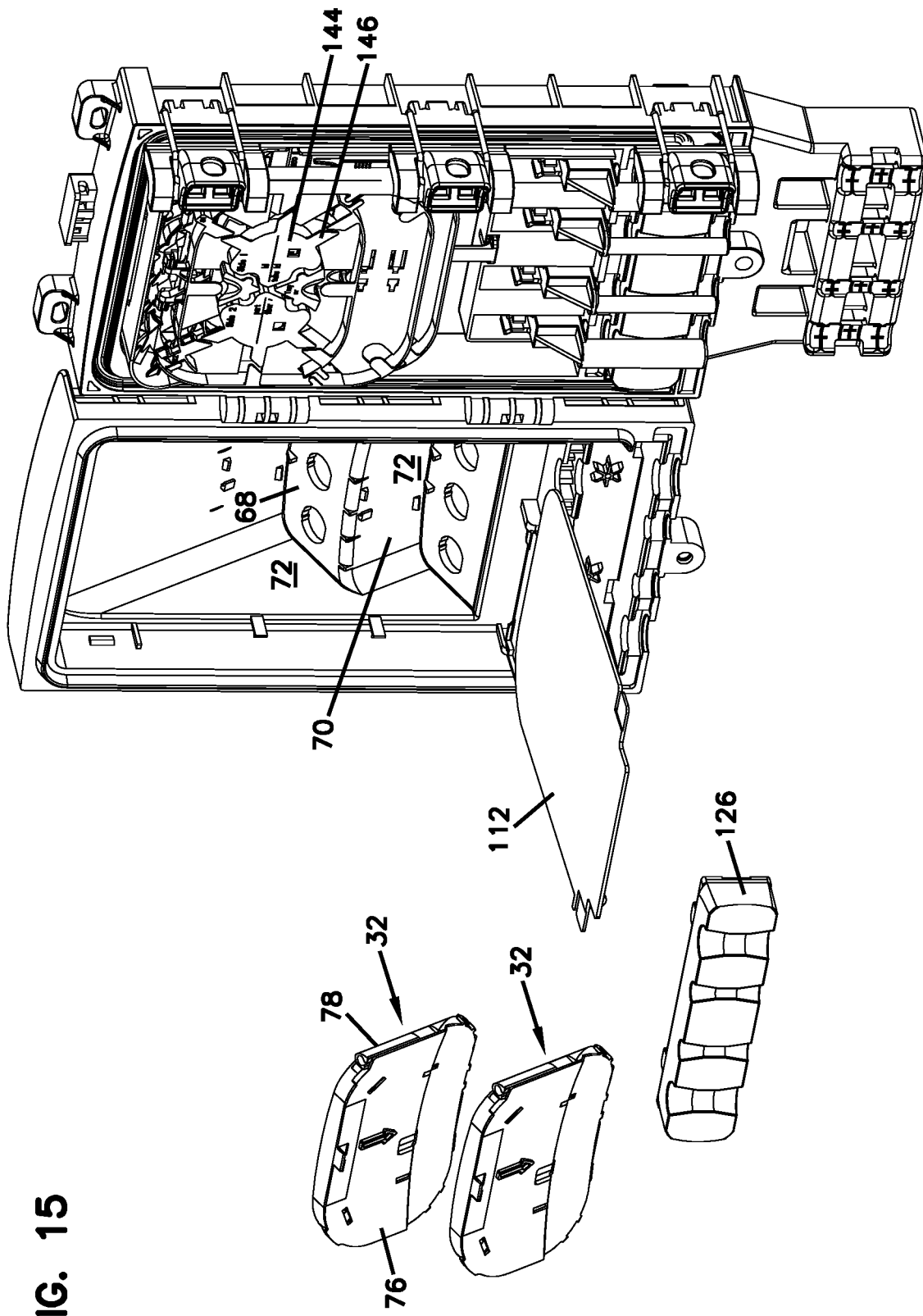
FIG. 15 illustrates the enclosure of FIG. 14 with the splitter modules of the enclosure also in an exploded configuration.
Figure 16:
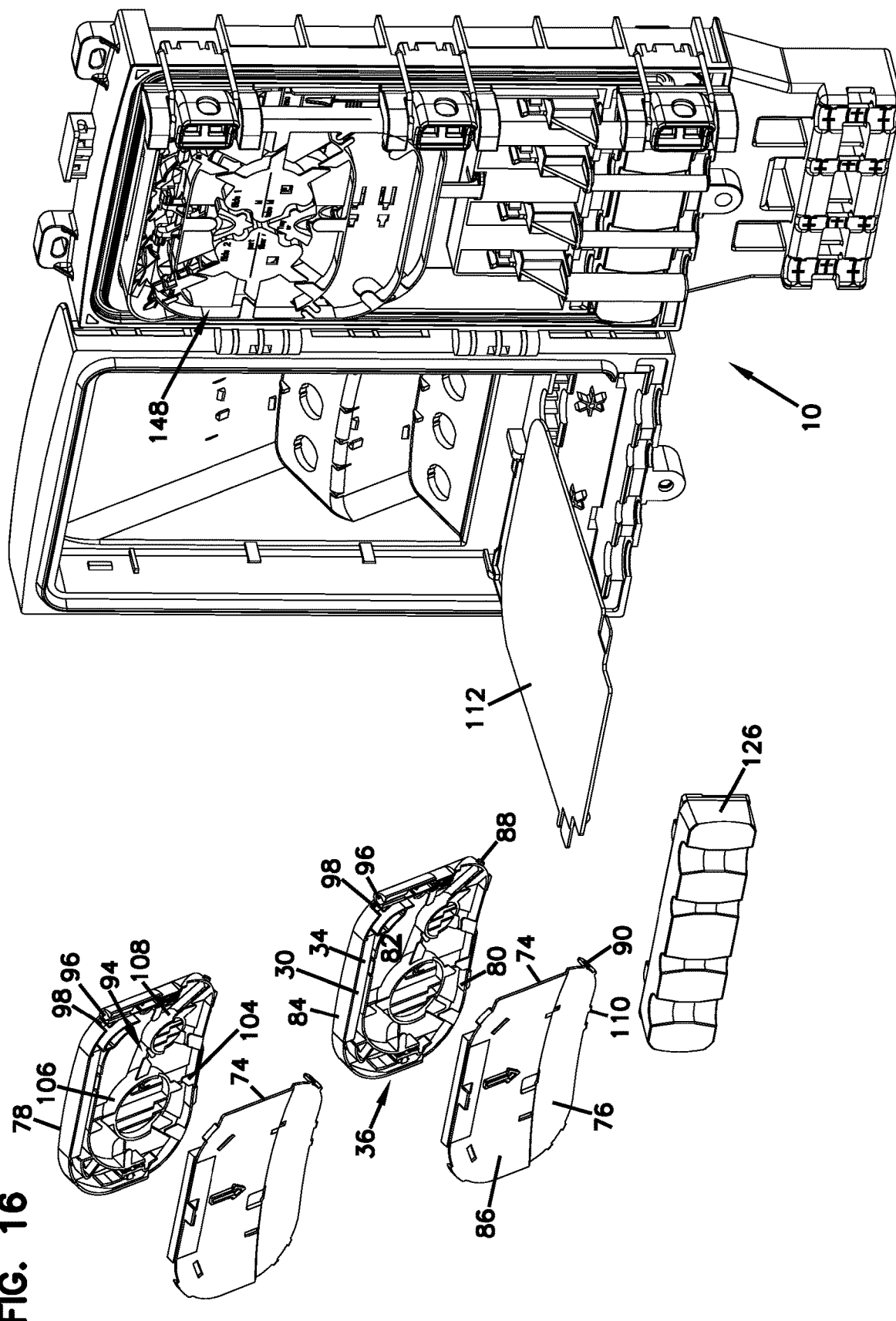
FIG. 16 illustrates the enclosure of FIG. 15 with the covers of the splitter modules removed therefrom to show the internal features thereof.

The modular elements in the form of splitter modules 32 are shown in an exploded configuration off the enclosure 10 in FIGS. 15 and 16. In FIG. 16, the housings 36 of the modular elements 32 are shown without covers 74 thereof to illustrate the internal features.

As noted above, each splitter module 32 defines a module housing 36. The module housing 36 defines a first major surface 76 connected to a second major surface 78 by a circumferential edge 80. The module housing 36 defines an interior 82 between the major surfaces 76, 78.

As shown in FIG. 16, the module housing 36 includes a first part 84 and a second part 86 that cooperate to define the interior 82. In some implementations, the first part 84 defines one of the major surfaces 76, 78 and the circumferential edge 80, and the second part 86 defines the other of the major surfaces 76, 78. In other implementations, both parts 84, 86 may define the circumferential edge 80. In the example shown, the first part 84 defines the second major surface 78 and the circumferential edge 80, and the second part 86 defines the first major surface 76. In some implementations, the first part 84 is configured to carry an optical device such as the optical splitter 34, and the second part 86 is provided as a removable cover 74 that covers an open side of the first part 84 to enclose the splitter 34.

In some implementations, various connecting structures hold the second part 86 to the first part 84. For example, in certain implementations, latching tabs 88 may extend from one of the parts 84, 86 and engage recesses 90 defined in the other of the parts 84, 86.

As shown in FIG. 16, the interior 82 of the module housing 36 can include an optical device (e.g., splitter) mounting region 92 and a fiber routing region 94. In the depicted embodiment, a fiber inlet opening 96 is at a right, top corner of the module housing 36. Outlet openings 98 may be defined at the top right and left corners of the module housing 36 by the circumferential edge 80. In other embodiments, the outlet openings 98 may be defined by the cover 74 (such as in the example of the module 32 shown in FIGS. 33-35). In the example shown in FIGS. 15-16, an optical device such as a splitter 34 may be disposed in the optical device mounting region 92, which is shown to be located between the fiber routing region 94 and the circumferential edge 80 defining the top end of the module 32. In other examples, however, the splitter 34 can be mounted anywhere within the interior 82 of the housing 36.

The inlet opening 96 is configured with an anchor 100 for securing a tube 102 carrying the input fiber or fibers 12. The anchor 100 defines a tube stop 198 for limiting slidability of the tube 102 during insertion of the tube 102 into the inlet opening 96. The inlet opening 96 provides access into the interior 82 of the splitter module housing 36.

Within the interior 82 of the splitter module housing 36, the fiber 12 is led from the input opening 96 directly into the fiber routing region 94. The fiber routing region 94 defines cable management tabs 104 that retain the fiber(s) 12, 28 within the fiber routing region 94. A large spool 106 and a smaller spool 108 are defined in the fiber routing region 94 to provide for different routing options for the fiber(s) 12, 28 routed within the module 32.

When the module 32 is a splitter module that includes a fiber optic splitter 34, output pigtails 28 are connected to an output end of the splitter 34. The output pigtails 28 are routed from the splitter 34 towards the outlet openings 98 of the module 32. Some of the output pigtails 28 can be wound around the spool arrangement consisting of the large spool 106 and the smaller spool 108 to direct the output pigtails 28 to the right outlet opening 98, and others of the output pigtails 28 can be wound around the spool arrangement to direct the output pigtails 28 to the left outlet opening 98. Accordingly, the output pigtails 28 can extend out through the outlet openings 98 in different directions.

In certain implementations, the interior 82 of the splitter module housing 36 may also include a region configured to retain a splice sleeve in addition to the splitter 34. The splice region may enable a repair to be made to one of the fibers 12, 28 within the splitter module 32.

Figure 14:
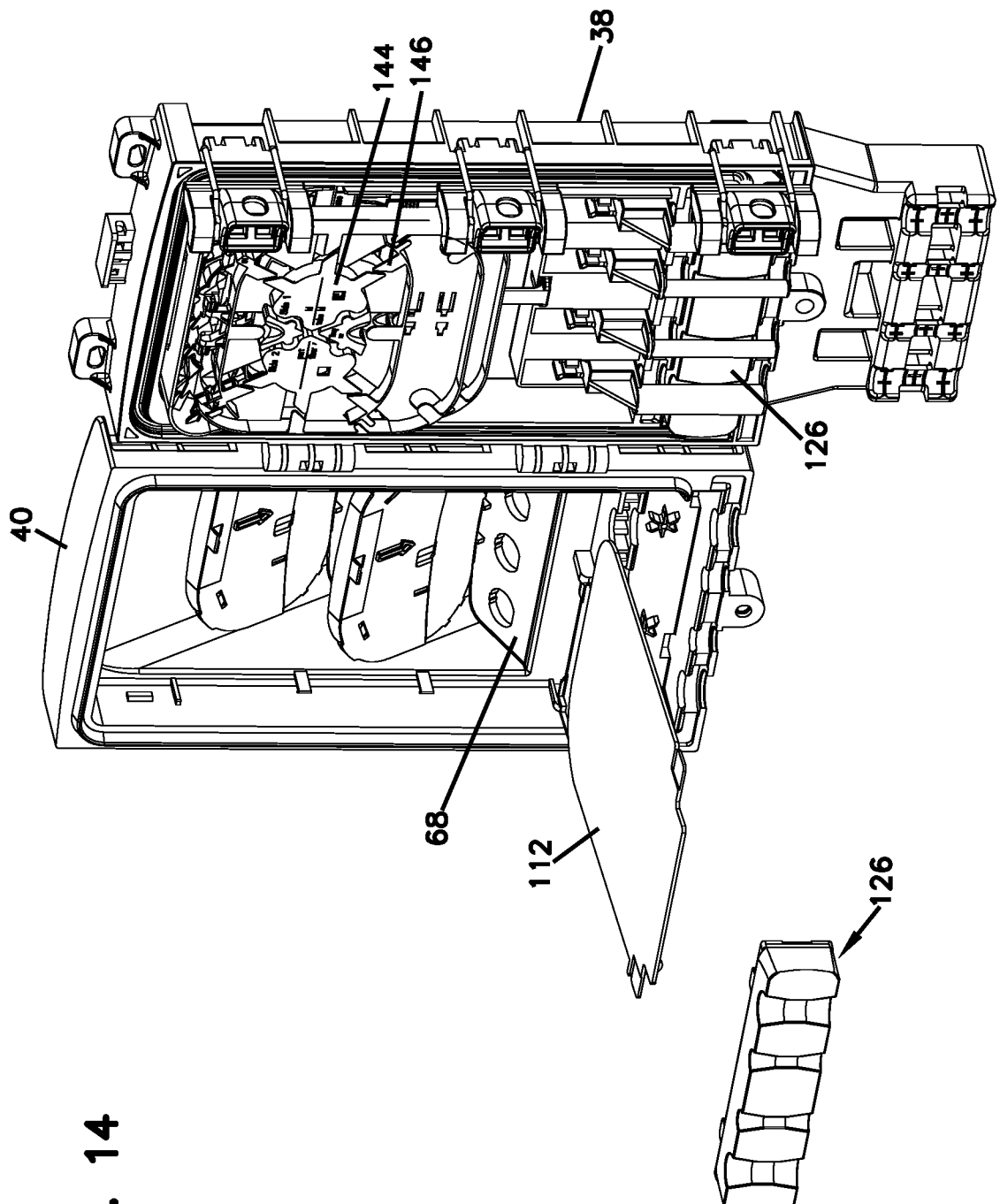
FIG. 14 illustrates the enclosure of FIG. 13 with the gel block of the cover of the enclosure in an exploded configuration.

Referring to FIGS. 14-16, the splitter module 32 may include a mounting arrangement that aids in securing the splitter module 32 within the pockets 72 defined by the cover 40 of enclosure 10 of the present disclosure. The mounting arrangement may include catches 110 that extend outwardly from the splitter module housing 36 (please see FIGS. 33-34).

The enclosure 10 may define structures in each pocket 72 that mate with the catches 110 of the splitter modules 32 for receiving the modules 32.

For further details relating to examples of mounting arrangements and methods of mounting the splitter modules 32 within the pockets 72 of the cover 40 of the enclosure 10, please refer to International Publication No. WO 2015/150204, the entire disclosure of which is incorporated herein by reference.

Figure 32:
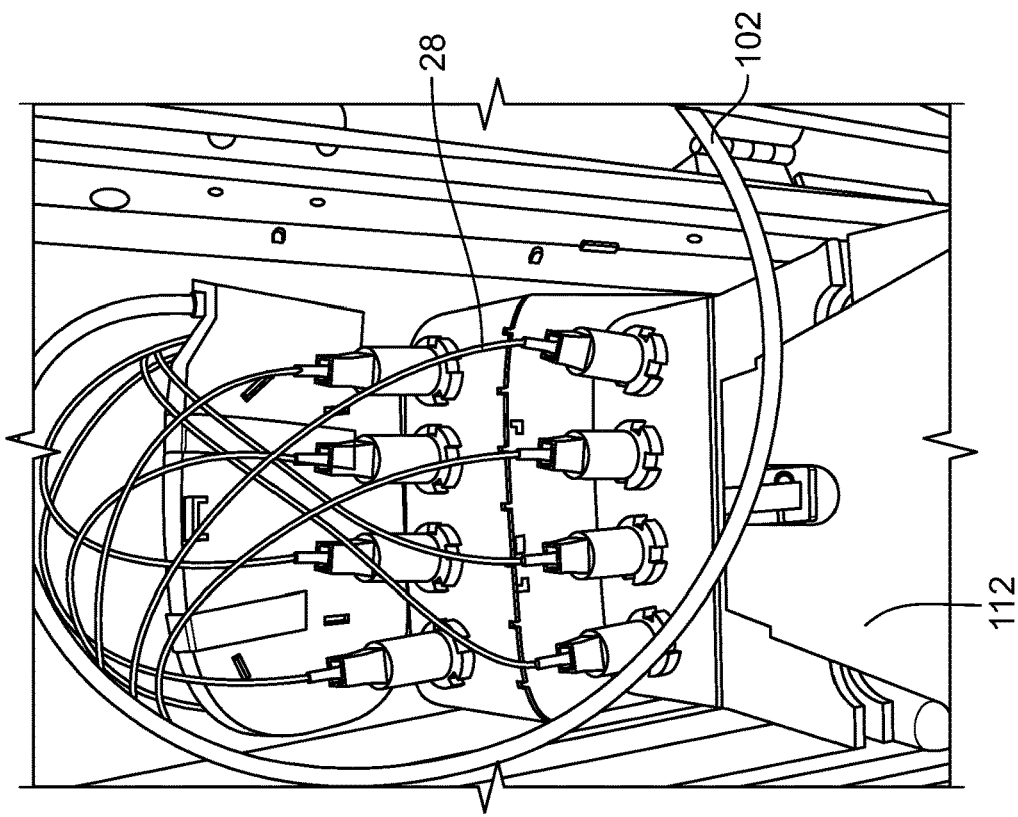
FIG. 32 illustrates the enclosure of FIG. 31 with all of the ruggedized fiber optic adapters of the cover populated with connectorized output pigtails extending from a splitter module.

The splitter modules 32 within the cover 40 of the enclosure 10 and the fiber optic adapters 26 mounted on the cover 40 of the enclosure 10 may be protected by a hingable protection cover 112 that is pivotally mounted to the cover 40 of the enclosure 10 as seen in FIGS. 14-16. The protection cover 112 is hinged to the cover 40 of the enclosure 10 adjacent the lower part of the cover 40 and defines tabs 114 adjacent the top thereof for latching with the cover 40 of the enclosure 10 adjacent the top side. As shown in FIG. 32, when a tube 102 carrying an input fiber 12 is routed from the base 38 of the enclosure 10 toward the splitter modules 32 at the cover 40 of the enclosure 10, the tube 102 is routed under the protection cover 112 to help retain the tube 102 within the cover 40 of the enclosure 10.

Figure 33:
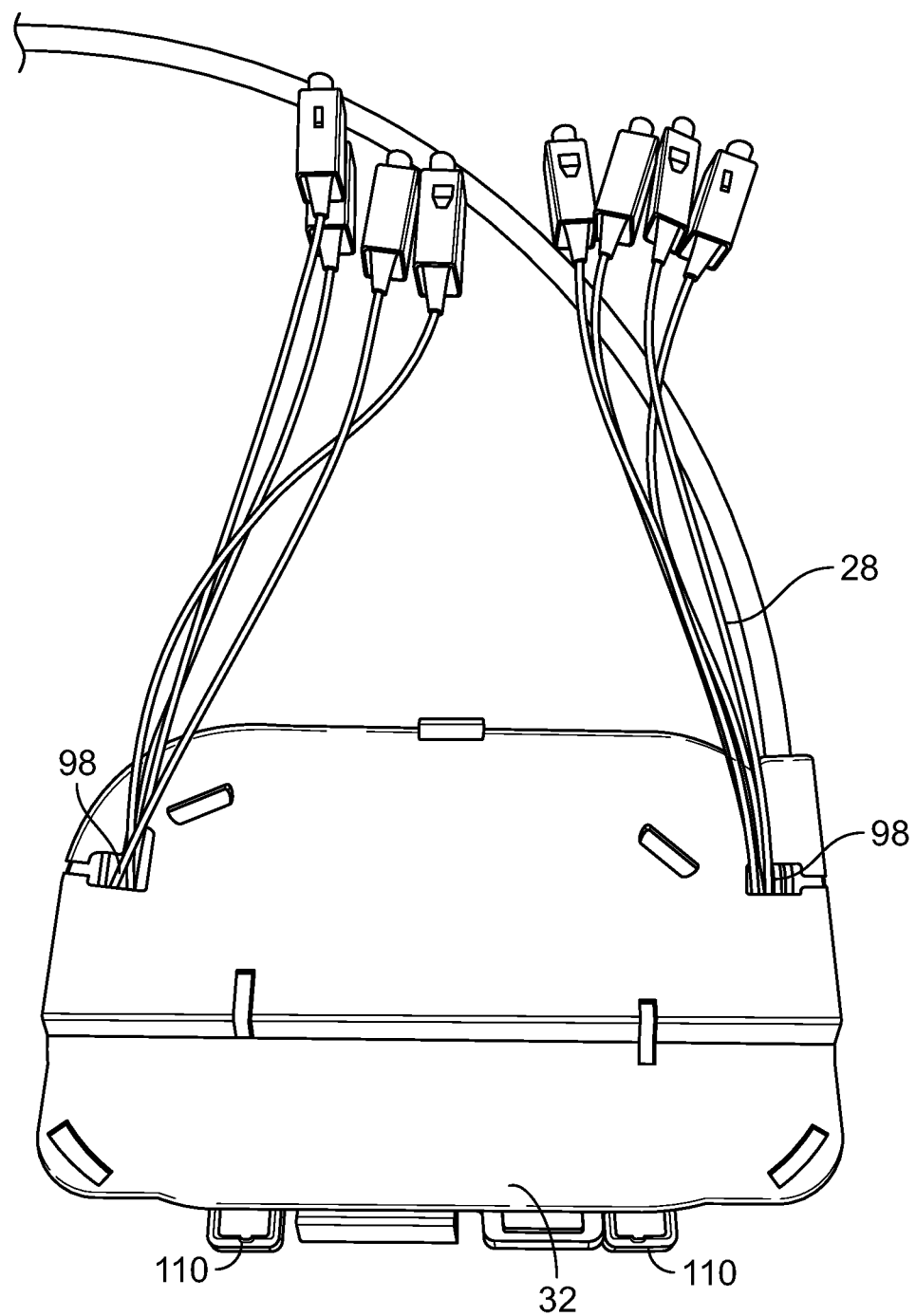
FIG. 33 illustrates a module similar to the splitter modules usable in the enclosure of FIGS. 1-20, the module shown with a straight-through cable routing configuration with all of the input fibers being output as connectorized pigtails.
Figure 35:
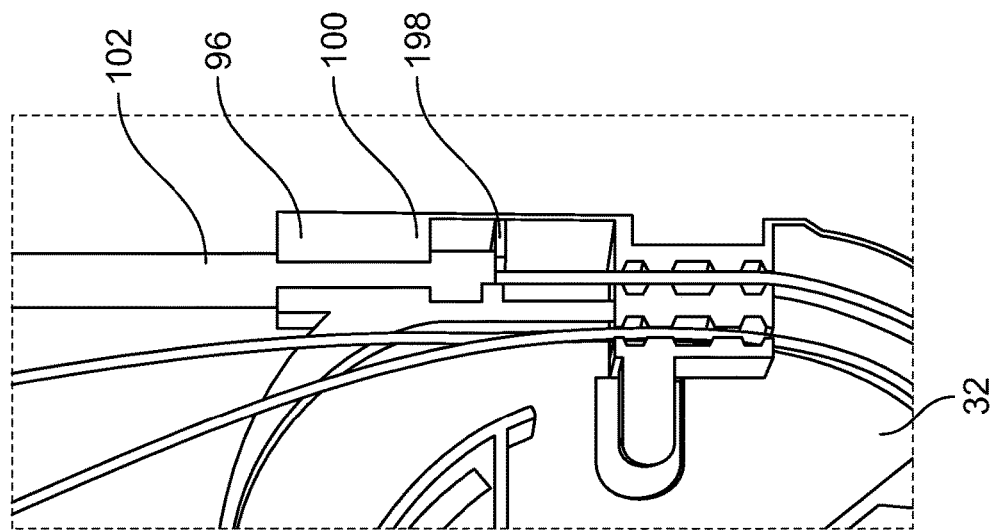
FIG. 35 is a close up view of the tube input location of the module of FIG. 34.
Figure 34:
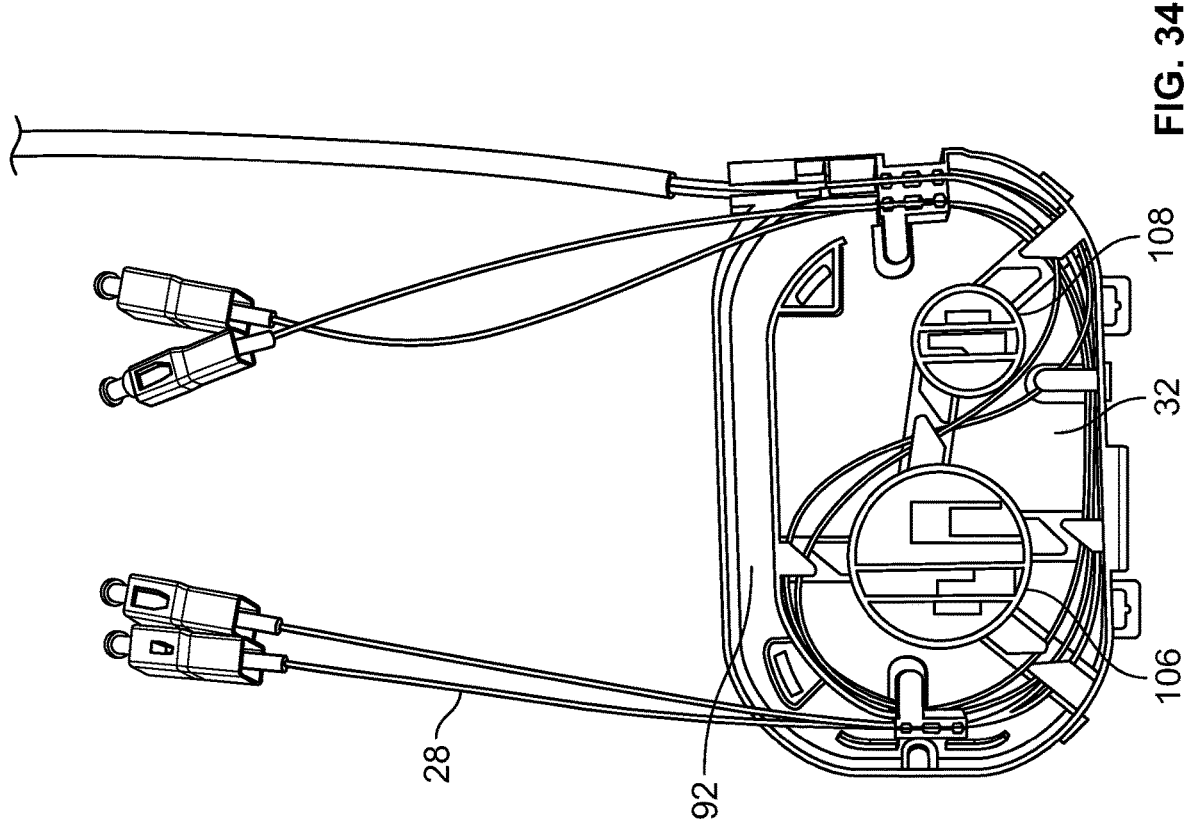
FIG. 34 illustrates the module of FIG. 33 without the cover thereof to show the internal cable routing within the module.

Also, as discussed previously, even though the modular elements within the enclosure 10 have been discussed as modules that house optical elements in the form of splitters 34, in other embodiments, the modules 32 may provide straight-through cable routing. FIGS. 33-35 illustrate a module similar to the splitter modules 32 usable in the enclosure, the module shown with a straight-through cable routing configuration with all of the input fibers 12 being output as connectorized pigtails 28. Instead of a single fiber 12 that is input into the module 32 being power split into a plurality of output pigtails 28 by an optical splitter 34, the module shown in FIGS. 33-35 provides cable management for fibers 12 that are passed straight through. In the depicted example in FIG. 33, a tube 102 carrying eight fibers is secured to the module housing 36. After the fibers 12 are routed around the cable management structures provided in the module, the fibers 12 are output from the module as connectorized pigtails 28. The module illustrated in FIG. 33 is configured to populate all of the ruggedized adapters 26 on the cover 40 of the enclosure 10, whereas the module in FIG. 34 is acting as a straight-through module for a tube 102 carrying only four fibers 12. FIG. 35 illustrates the tube anchor portion 100 of the module housing 36 wherein a tube 102 carrying the input fibers 12 can be slidably mounted until reaching the tube stop 198 in the anchor region 100.

Thus, rather than carrying power splitters 34, the modular elements located within the enclosure 10 can be used for straight-through patching.

Now referring to FIGS. 11-32, the base 38 of the enclosure 10 is used for receiving the input signals that are to be processed and for directing the input signals toward the splitter modules 32 that are located on the cover 40. As will be discussed in further detail below, the base 38 may include locations or trays 116 used for splicing fibers 12 carrying input signals to fibers (carrying the same signal as fibers 12) that lead to the splitter modules 32. The base 40 also includes a storage tray 118 positioned underneath the splice trays 116 for storing unprocessed/unused fibers. The storage tray 118 can be seen in FIG. 19.

Figure 18:
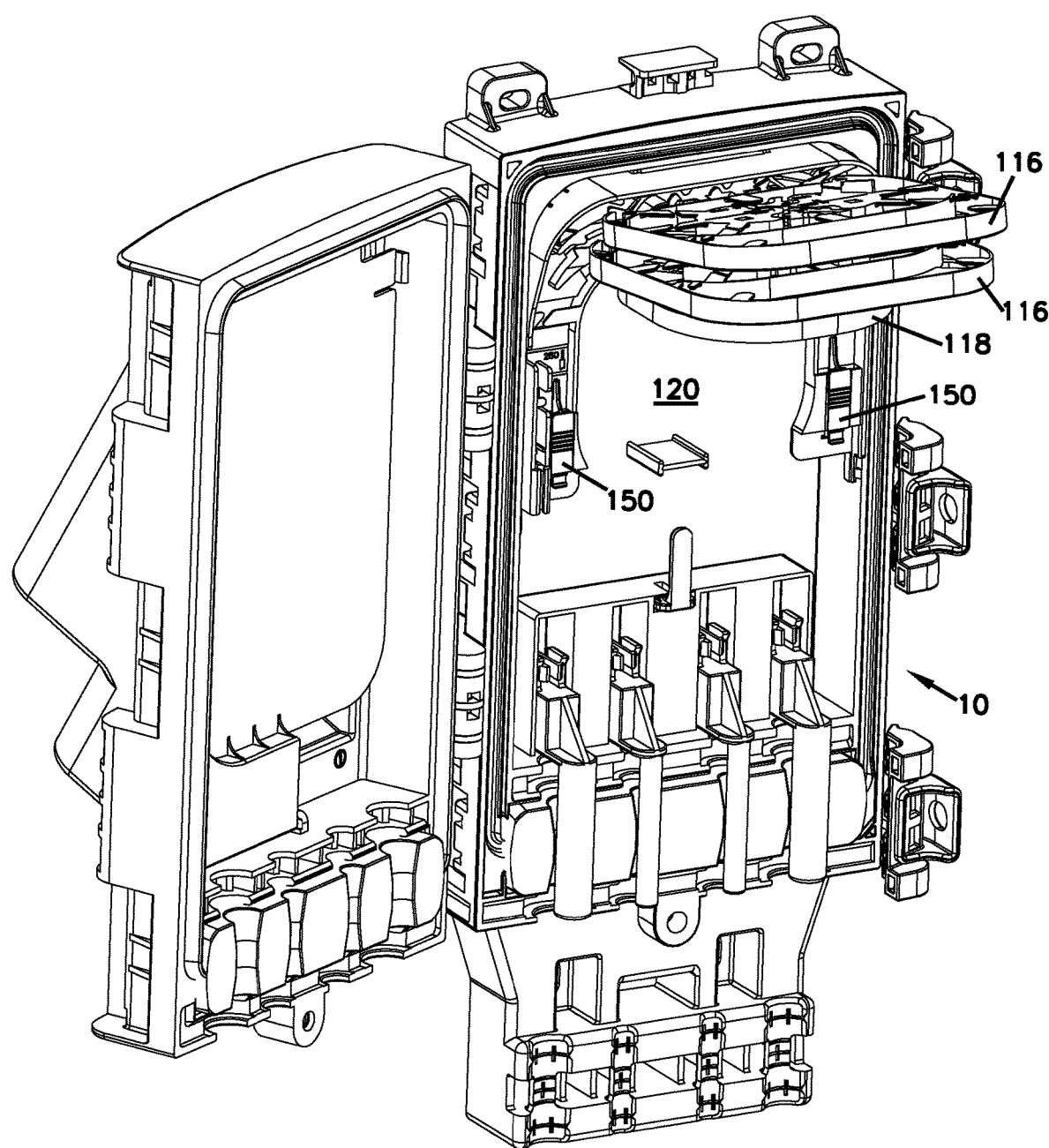
FIG. 18 illustrates the enclosure of FIG. 17 with the splice module of the enclosure mounted within the base and the storage tray and the splice trays of the splice module in a pivoted position.
Figure 21:
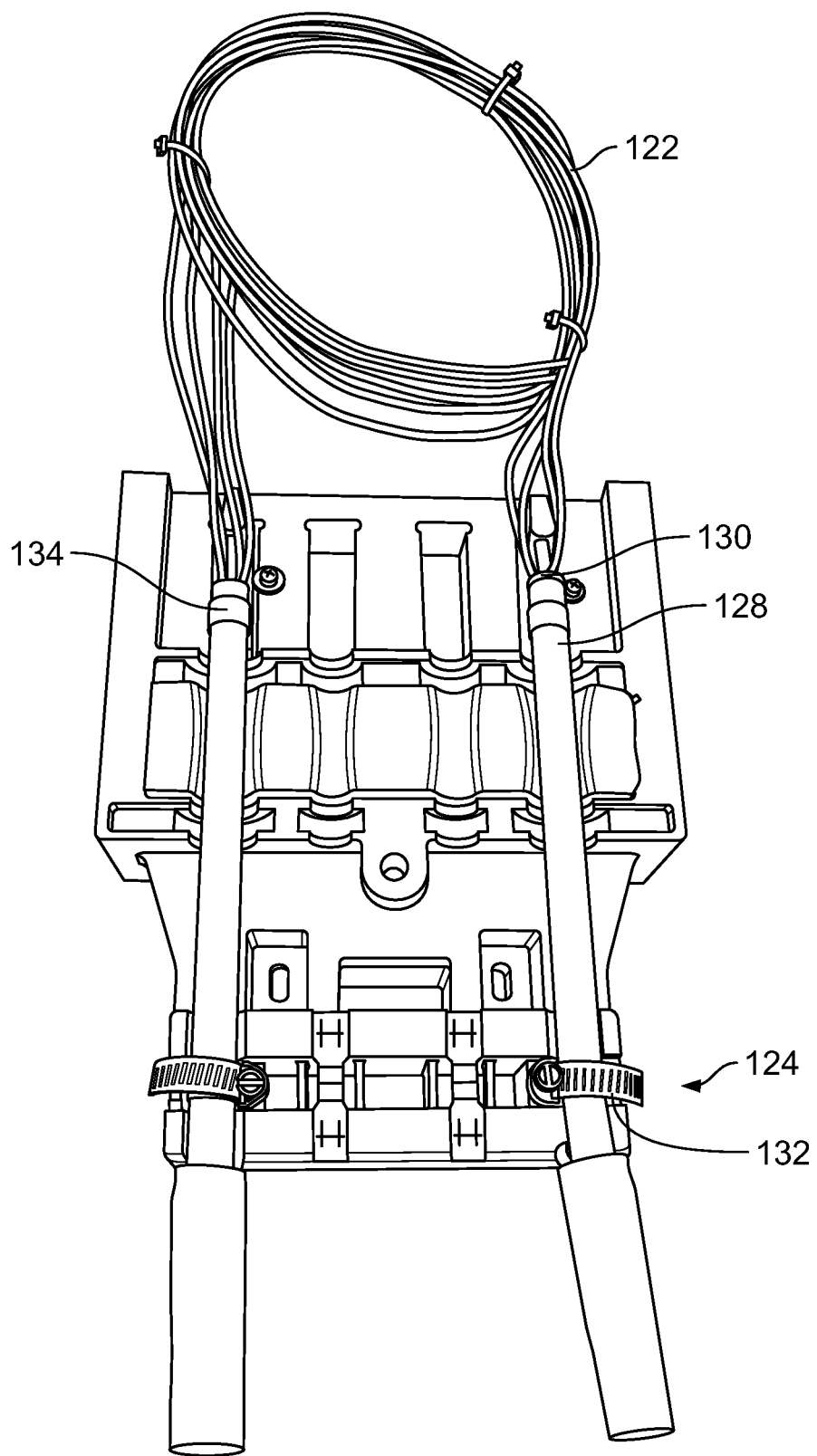
FIG. 21 illustrates the entry region of the enclosure of FIGS. 1-20 with a feeder cable loop anchored to the enclosure.
Figure 22:
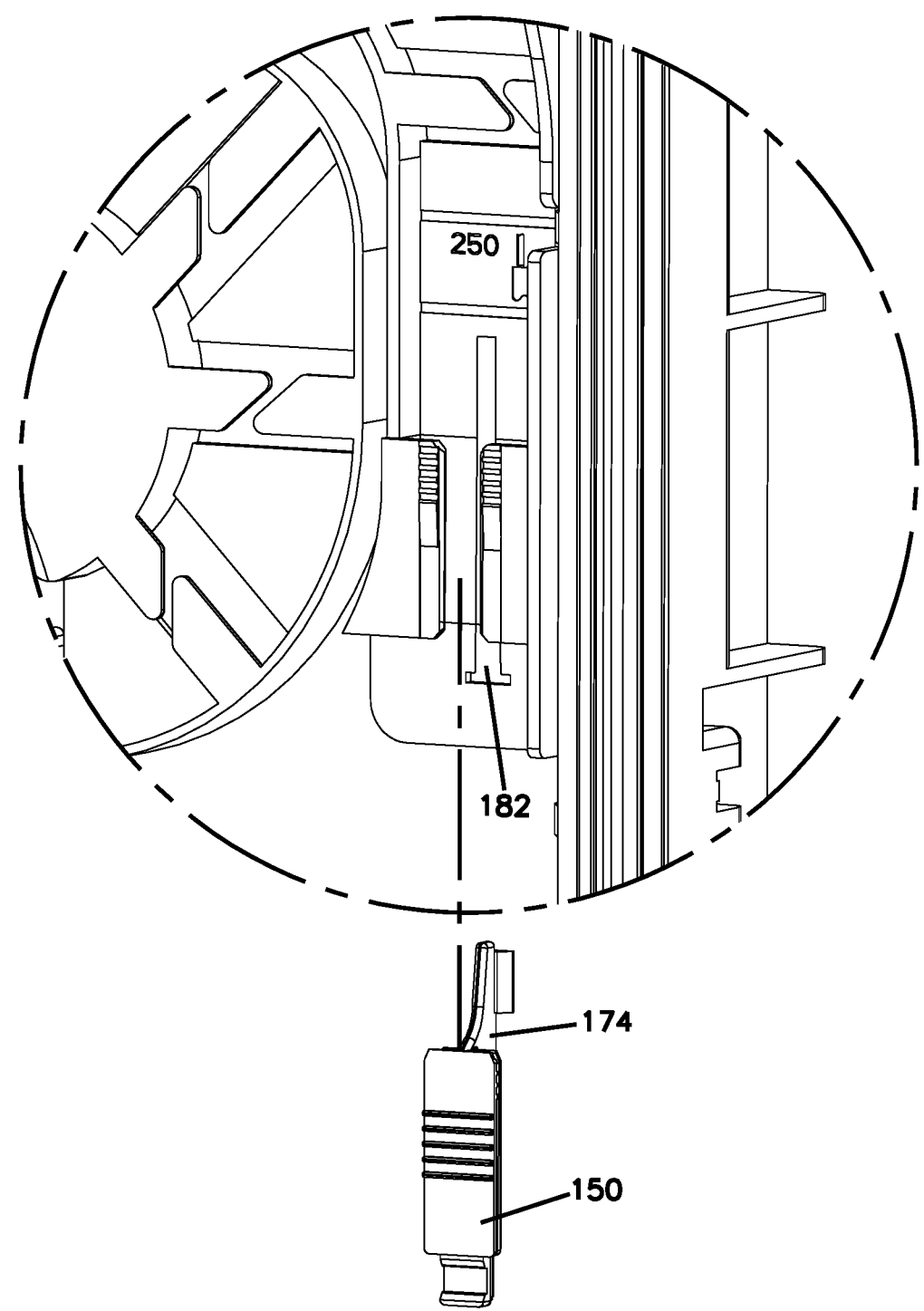
FIGS. 22-26 illustrate the slidable mounting of a tube holder to the base of the enclosure for securing the tubes of feeder or branch cables to the enclosure.
Figure 23:
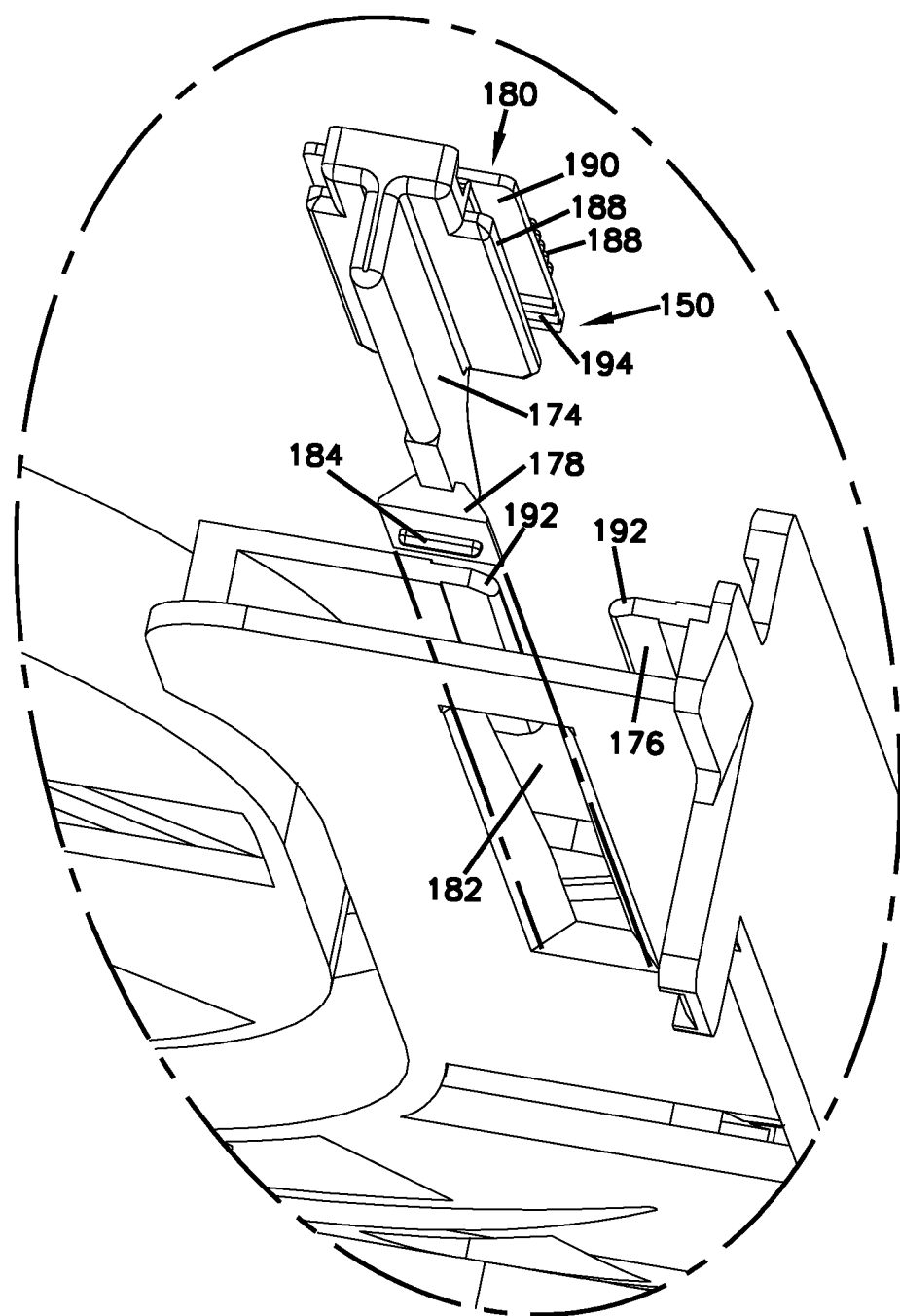
Figure 24:
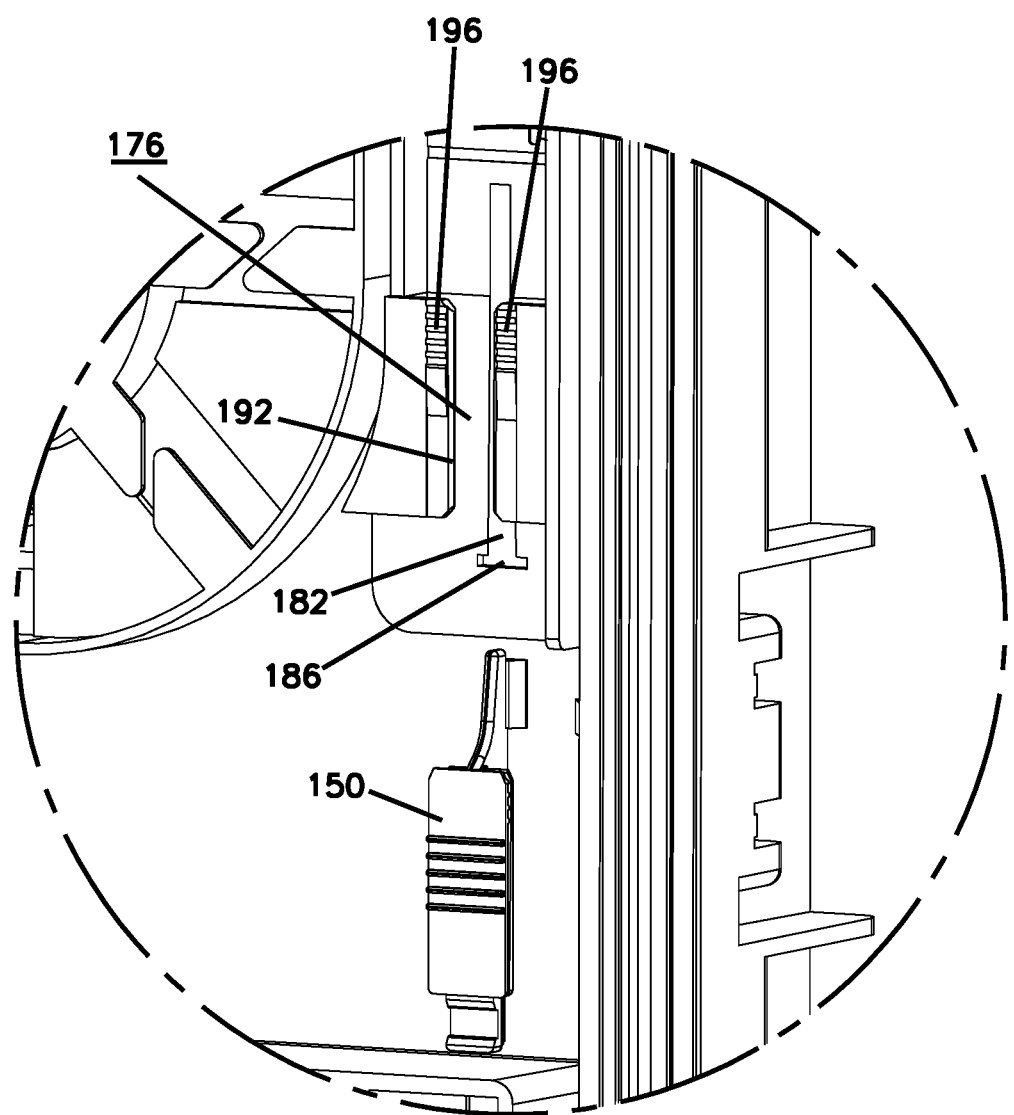
Figure 25:
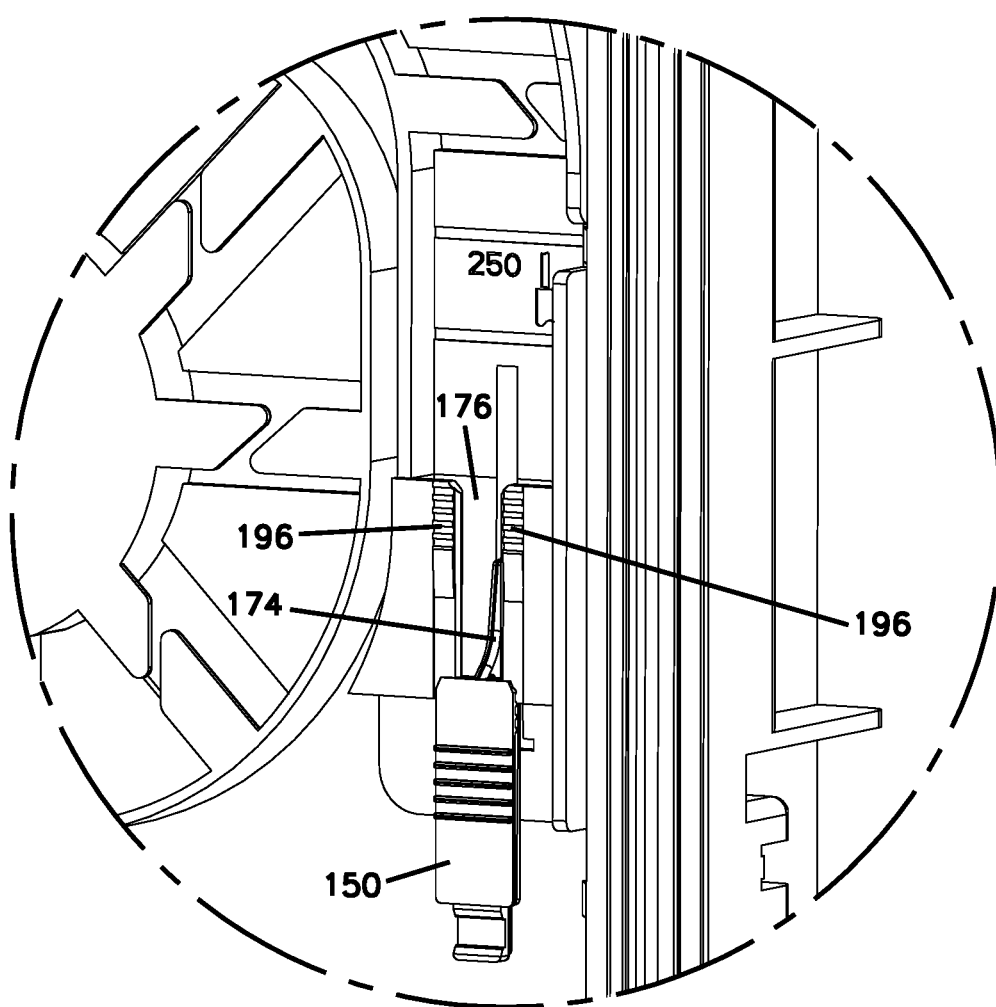
Figure 26:
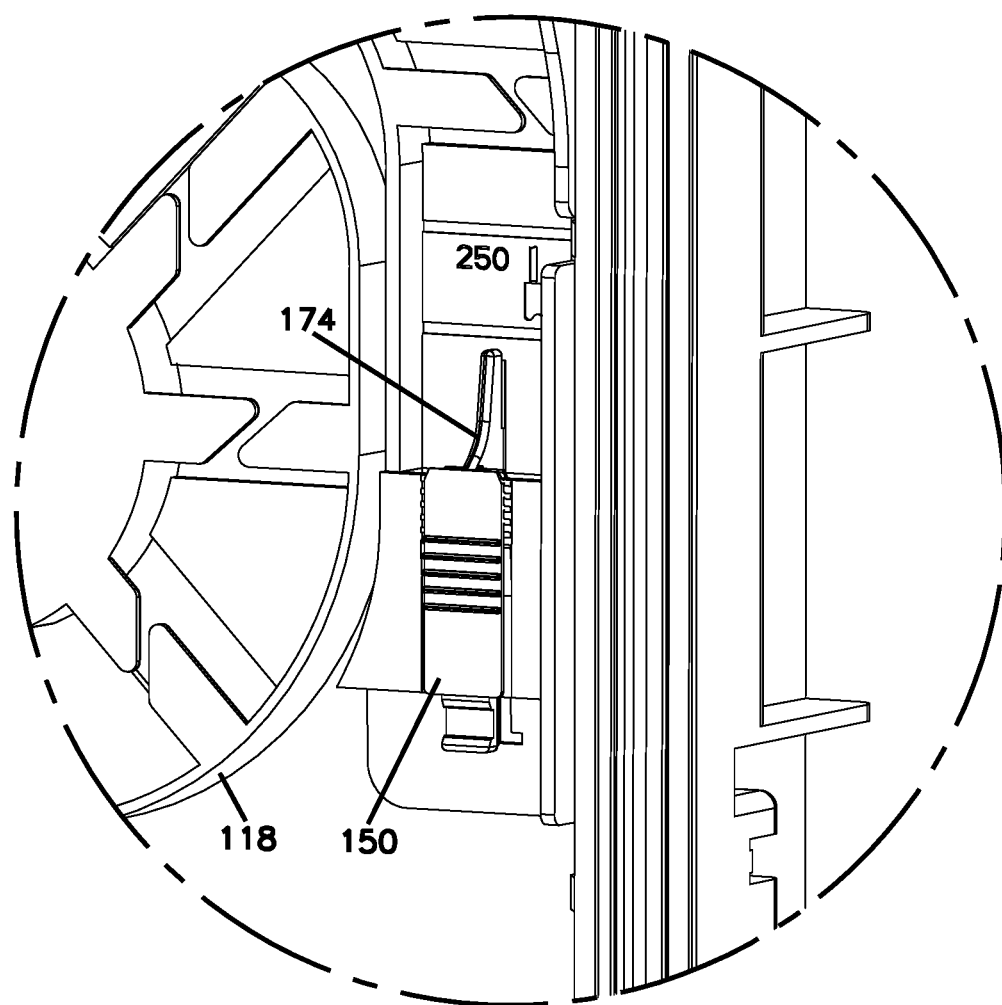

Furthermore, the interior 18 of the enclosure 10 may also define a pocket 120 underneath the storage tray 118 for storing the unused loop 122 of the feeder cable 14 coming into the enclosure 10 as will be discussed in further detail below (please see FIGS. 18 and 21).

According to an example arrangement for the enclosure 10, a feeder cable 14 that includes the fibers 12 carrying the input signals enters the enclosure through the input ports 16 defined at the base 38.

In some implementations, the input ports 16 may be defined solely by the base 38. In other implementations, as in the depicted example, the base 38 and the cover 40 may cooperate to define the input ports 16. In the example shown in FIGS. 1-32, the base 38 and the cover 40 each define a partial port opening that align to form the input ports 16 when the cover 40 is closed relative to the base 38.

In some implementations, the base 38 may include an anchoring region 124 at which the feeder cable 14 can be anchored. The anchoring region 124 houses the gel block 126 for the base 38 and is disposed under the splice region defined by the splice trays 116, which are located closer to the top 46 of the enclosure 10. The feeder cable 14 entering the enclosure 10 generally includes the feeder fiber 12, a jacket 128, and/or a strength layer 130 that can be attached to the base 38 at the anchoring region 124. As shown in FIG. 21, the jacket 128 of the feeder cable 14 may be attached to the anchoring region 124 via structures such as hose clamps 132. And, still referring to FIG. 21, after entering through an input port 16, the strength layer 130 of the feeder cable 14 may be anchored to the base 38 via a strain relief device 134. For further description relating to the strain relief device 134 and the method of using thereof, please refer to U.S. Patent Publication No. 2015/0093090 and International Publication No. WO 2015/144397, the entire disclosures of which are incorporated herein by reference.

In certain implementations, the base 38 and the cover 40 both cooperate to activate the gel block 126 or other seal at the input ports 16. The gel block 126, as noted above, inhibits ingress of contaminants into the enclosure 10 through the input ports 16. In some implementations, the base 38 defines a sealing pocket 136 (e.g., at the anchoring region 124) in which the gel block 136 seats. In certain implementations, the cover 40 also can define a sealing pocket 136 aligned with the base sealing pocket 136. In certain examples, the cover 40 and base 38 compress two gel blocks 126 together when closed. The feeder cables 14 are routed between the gel blocks 126.

According to an example embodiment, the feeder cable 14 that enters the enclosure may carry a plurality of separate input tubes 138, each carrying a plurality of input fibers 12. According to one embodiment, the feeder cable 14 may carry six fiber-protecting tubes 138. For processing, one of the tubes 138 may be separated from the rest for further processing. The tube 138 that is separated is trimmed and the fibers 12 therein are exposed. The unused tubes 138 (e.g., five of the tubes 138 from the feeder cable 14) may be stored as a loop 122 in the pocket 120 underneath the storage tray 118. Please refer to FIG. 21 for an example of a feeder cable loop 122 that can be stored in the pocket 120 of the enclosure 10.

From the trimmed tube 138, one of the fibers 12 is cut for further processing (e.g., splicing and splitting). The uncut fibers are lead to the storage tray 118 for fiber storage or future use. The uncut fibers 12 (e.g., 250-micron) are stored within the storage tray 118 in an uncut loop.

For those fibers that are going to be stored in the storage tray 118, the uncut fibers follow the lowest of three passageways 140 that lead from a tube holding location 142 on the enclosure 10. The uncut fibers, after being stored as a loop in the storage tray 118, leave the enclosure 10 through the same port 16 that the unused tubes 138 leave. Thus, the enclosure is used essentially for storing unused tubes 138 in a loop 122 in the pocket 120 below the storage tray 118 and also for storing unused, uncut fibers in a loop in the storage tray 118, before all of the unused tubes 138 and unused fibers 12 are lead out of the feeder cable exit port 16 (or branch cable exit port if those tubes and fibers are from a branch cable 20 as opposed to a feeder cable 14) with feeder cable 14.

The fiber 12 to be processed is routed to one of the splice trays 116 and is spliced to a fiber that leads to one of the splitter modules 32 on the cover 40. The splice trays 116 enable the splitter input fibers to be spliced to incoming feeder fibers 12.

If one fiber 12 is to be processed, that fiber 12 either leads to the middle splice tray 116 by following the middle of the three passageways 140 that lead from the tube holding location 142 or to the uppermost tray 116 by following the uppermost of the three passageways 140 that lead from the tube holding location 142.

Figure 17:
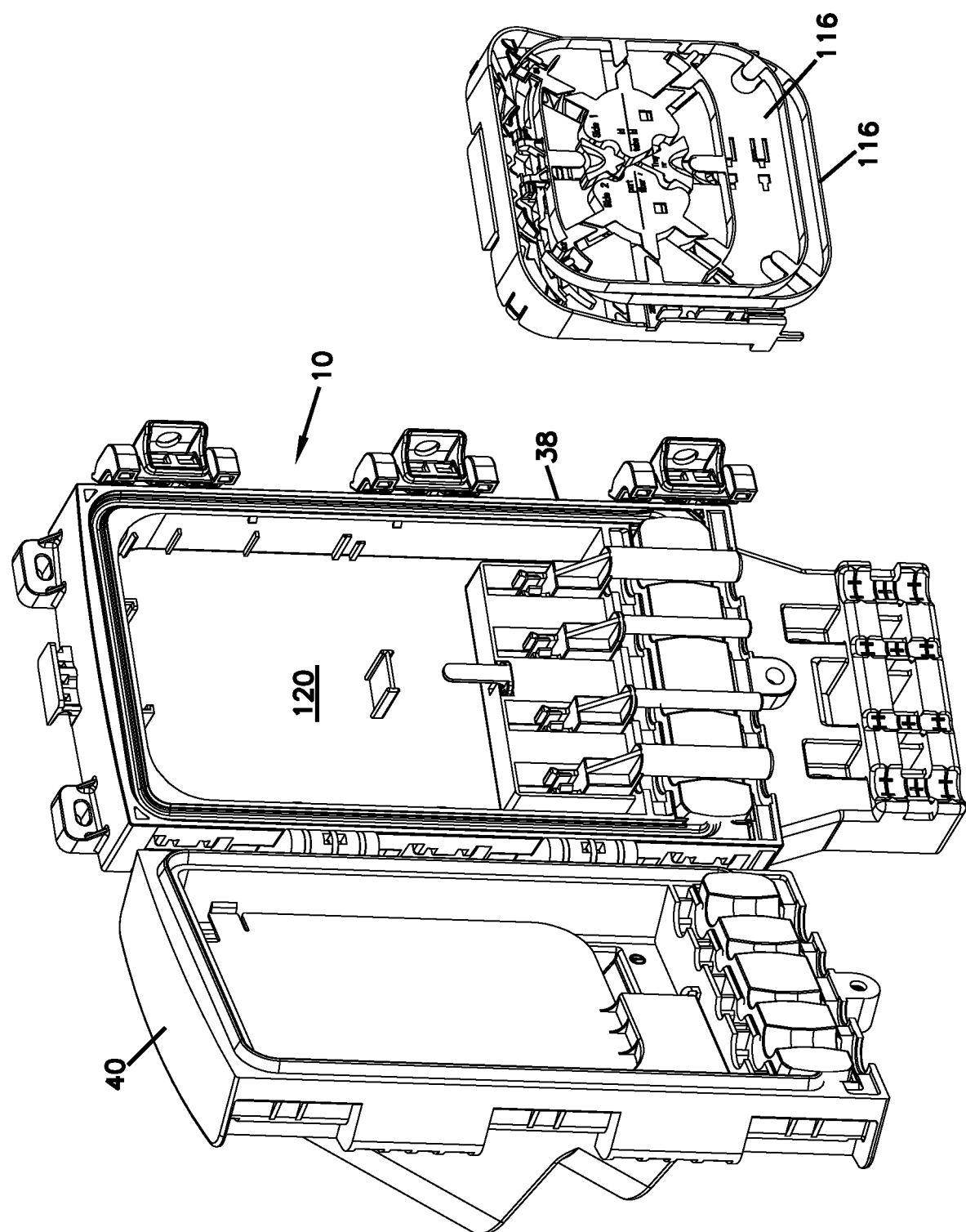
FIG. 17 illustrates the enclosure of FIG. 12 with the splice module in an exploded configuration.
Figure 19:
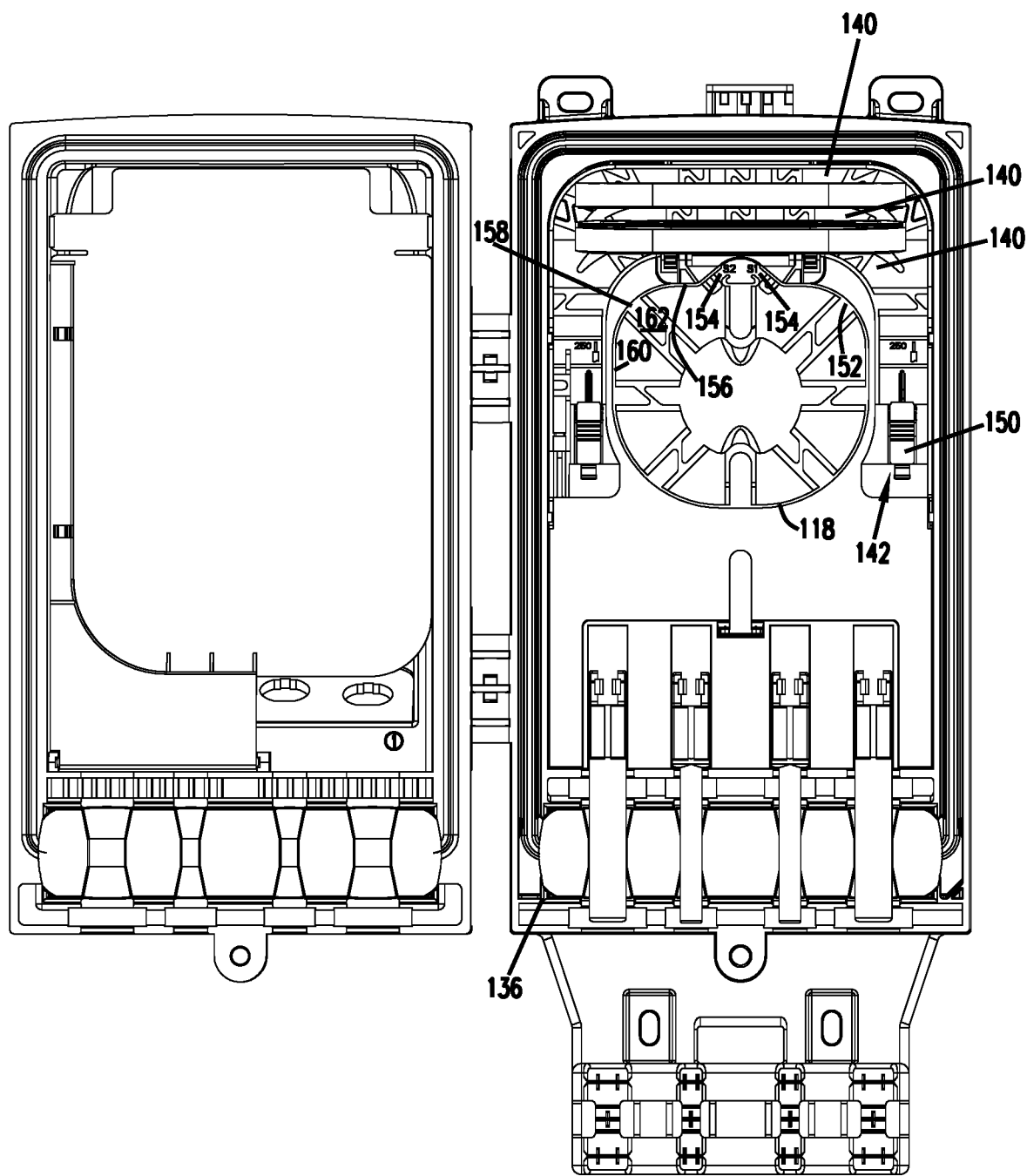
FIG. 19 illustrates the enclosure of FIG. 18 from a front view with the storage tray in the non-pivoted position.
Figure 20:
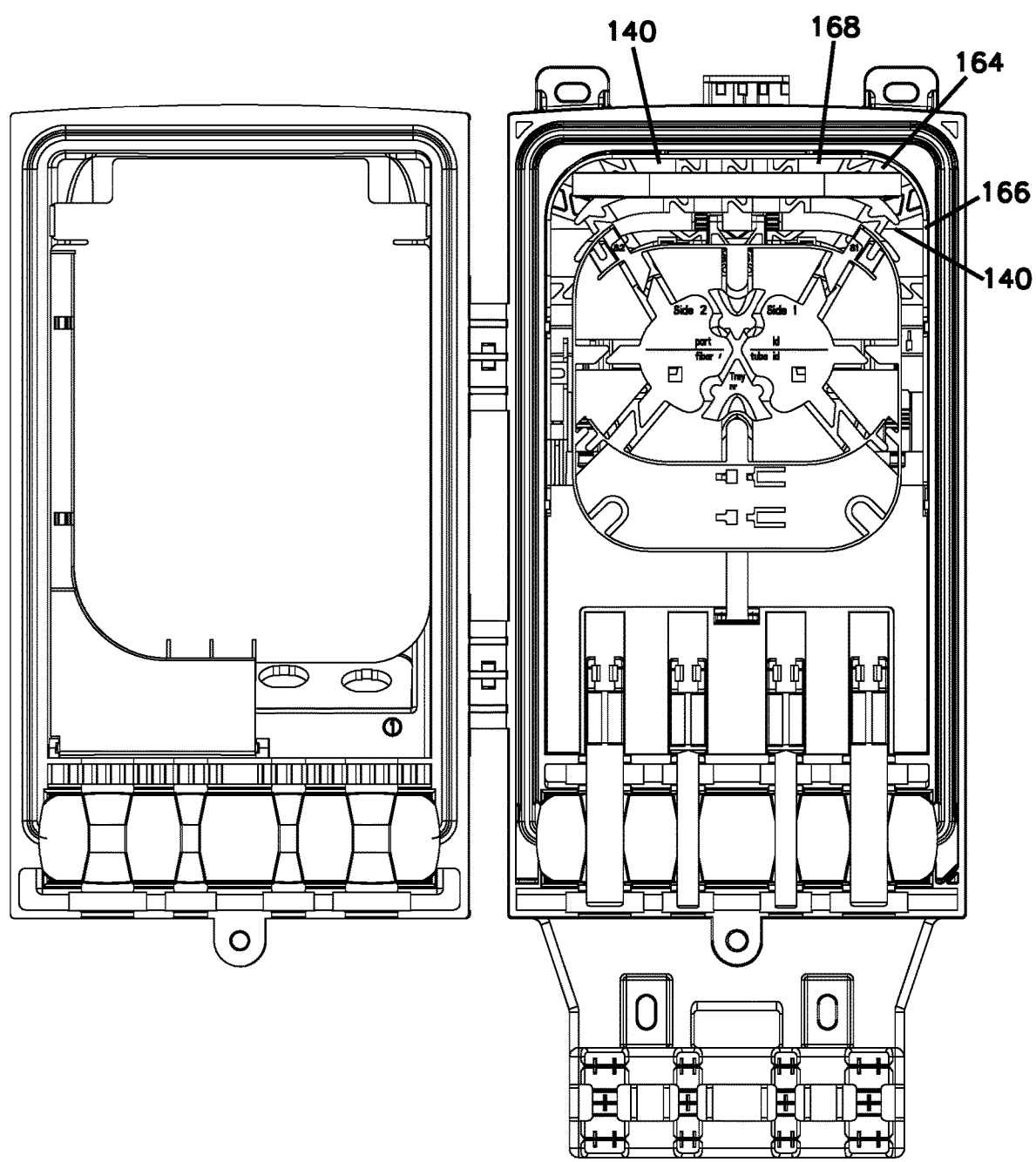
FIG. 20 illustrates the enclosure of FIG. 19 with one of the splice trays also in the non-pivoted position.

It should be noted that a fiber 12 to be processed coming from the right side 50 of the enclosure 10 is lead through one of the passageways 140 and enters a splice tray 116 from the left upper side of the tray 116. That fiber 12 is initially wrapped around a cable management spool 144 (and retained therein via cable management fingers 146) before being lead to a splice area 148, which is located underneath the cable management spool 144 as shown in FIGS. 17, 19, and 20.

Due to temperature variations, the tubes 138 carrying the fibers 12 may expand or contract at a different rate than the fibers 12. In certain instances, when the tubes 138 contract or shrink at a different rate than the fibers 12, the fibers 12 will experience a "grow-out" effect. The shrinking tubes 138 along the entire length of the feeder cable 14 will push the fibers 12 further into the enclosure 10. For example, a 1% grow-out might mean that an extra 2-3 cm of 250-micron fiber 12 needs to be accommodated. The extra "over-length" of fiber 12 needs to be accommodated while still keeping the fiber 12 organized/retained within enclosure 10. Parts of the enclosure 10 include features for accommodating such grow-out of the fibers 12.

For example, as will be described in further detail below, a tube holder 150 that is located at the tube holding location 142 of the enclosure 10 allows the 250-micron fibers 12 that are protruding from the cut tube 138 to have more room in front of/above the tube holder 150. The tube holder 150 is made generally smaller so as to leave more room for the fiber 12 to grow forwardly before being lead to either the storage tray 118 or the splice trays 116. The smaller size tube holder 150 requires the tube 138 to be cut at a shorter length, exposing the fibers 12 earlier into the enclosure 10. The smaller length of the tube 138 protruding into the enclosure 10 allows more room for the 250-micron fiber 12 to grow out toward the storage/splice trays during temperature variations.

Another grow-out feature or zone may be seen in the storage tray 118, specifically in the upper right and left corners 152 of the storage tray 118.

For example, as the fiber(s) 12 is entering the storage tray 118 after leading through the lowest of the three passageways 140 (e.g., going from the right side 50 toward the left side 52 of the enclosure 10), the fiber 12 is routed into an angled input port 154 of the storage tray 118. When the fiber 12 is routed into the storage tray 118 through the input port 154, the fiber 12 generally lays adjacent the upper edge wall 156 of the angled input port 154 and is then lead directly into the tray 118. As shown in FIG. 19, just past the angled input port 154, the upper edge wall 156 of the storage tray 118 leads straight left and provides a curved transition 158 from the upper edge wall 156 to the left edge wall 160. The curved transition section 158 (i.e., the upper left corner 152 of the storage tray 118) borders a grow-out zone/area 162 where the fiber can expand if met with temperature variations. Where the fiber 12 entering the storage tray 118 would follow the same angle as the input port 154 of the storage tray 118 under normal circumstances and lead directly toward the left edge wall 160 of the storage tray 118, if the fiber 12 experiences a grow-out, the fiber 12 can expand and be accommodated by the grow-out zone 162 bordered by the curved transition section 158 between the upper edge wall 156 and the left edge wall 160 (i.e., corner) of the storage tray 118. The "grow-out" corner 152 may be designed to accommodate 2-3 cm of fiber growth.

The three passageways 140 that lead from the tube holding location 142 to the different trays (e.g., the storage tray 118 and the splice trays 116) have also been designed with similar grow-out zones 164 in the form of expanded corners. For example, the transition from the right or left walls 166 of the passageways 140 to the upper wall 168 have been designed generally with a small radius (i.e., a sharp bend) for the fiber(s) 12, preferably still meeting the minimum bend radius requirements of the fiber(s) 12. However, in addition to the sharper bend, the upper corners have also been designed with grow-out zones 164. Thus, similar to the concept used in the entrance of the storage tray 118, the fibers 12 are forced to take a sharper turn from the right and left walls 166 when they abut the upper walls 168 of the passageways 140, leaving a certain amount of space or grow-out zone 164 in the expanded corners. Thus, when the fibers 12 experience a grow-out, the fibers 12 have room to grow into these corners. The passageways 140 are made wide enough to accommodate the initial bend of the fiber 12 and also any grow-out that might be experienced by the fiber 12. The forced bend in combination with the curved expanded corner essentially allows room for the fibers 12 to grow during temperature variations.

Figure 31:
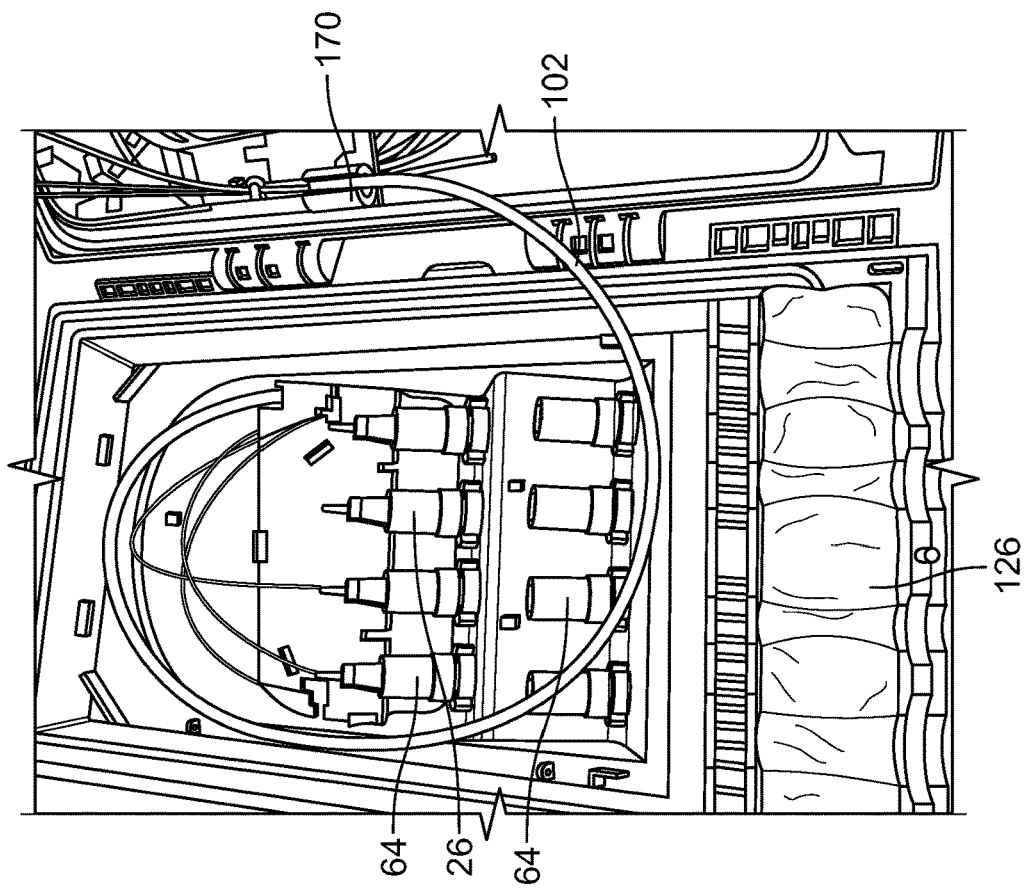
FIG. 31 illustrates an example cable routing configuration for the enclosure of FIGS. 1-20 showing input fibers surrounded by a tube extending from the splice trays of the base to the splitter modules of the cover and connectorized output pigtails extending from the splitter modules to the ruggedized fiber optic adapters of the cover.

Now referring to FIGS. 31-32, after the splicing operation in the splice trays 116, the fiber 12 that leads from the splice tray 116 to the splitter module 32 is protected by a tube 102, as discussed above, that crosses over the hinge of the enclosure 10. The tube 102 is secured/anchored to an output 170 of the splice tray 116 (please see FIG. 31) and is secured to an input 96 of the splitter module 32 (please see FIGS. 31, 32, 34, and 35).

In the depicted embodiment, two splice trays 116 are shown for the enclosure 10. As such, two of the fibers 12 from the feeder cable 14 can be spliced at each of the splice trays 116 to the input fibers that lead to the splitter modules 32. For example, since the enclosure 10 has eight output ports 24 (four per row), each input fiber may be split by a 1×4 splitter 34 in each of the two splitter modules 32, and the splitter outputs which are provided as connectorized pigtails 28 may populate the eight output ports 24.

According to another example arrangement, if a feeder cable fiber is being processed at the same time as a branch cable fiber, the branch cable fiber may be kept separate from the feeder cable fiber and lead to a different splice tray 116 from that of the splice tray 116 that receives the feeder cable fiber 12. From the splice trays 116, the branch cable fiber and the feeder cable fiber may lead to separate splitter modules 32 for the splitting operation and exit the enclosure.

Referring now to FIGS. 22-30, the tube holder 150 is used when routing the feeder cable tube 138 into the enclosure 10, further details of which are described below. And, when a feeder cable 14 is entering the enclosure 10 at the same time as a branch cable 20, the tube holder 150 is useful in keeping the tubes 138 from the different cables 14, 20 separate, as will be described below.

Still referring to FIGS. 22-30, the tube holder 150 of the enclosure 10 is shown in closer detail. The tube holder 150 is slidably mounted to a tube holding location 142 of the base 38 of the enclosure 10. The tube holder 150 defines a mounting portion 172 and a divider portion 174. The divider portion 174 extends away from the mounting portion 172 and is configured to divide the tube holding location 142 of the enclosure 10 into two separate channels 176 for keeping two cables separate (e.g., a tube of the feeder cable 14 and a tube of the branch cable 20).

The mounting portion 172 is defined by the combination of a dovetail structure 178 that protrudes from the divider portion 174 and a latch structure 180 that is positioned at an opposite side of the divider portion 174 from the dovetail structure 178. The dovetail structure 178 is used in slidably moving the tube holder 150 within a track 182 defined at the splice region of the base 38. The dovetail structure 178 defines a tab 184 underneath thereof (please see FIG. 23) that is used for initially inserting the tube holder 150 into the track 182. When inserting, the tube holder 150 is tilted generally perpendicular to the track 182, and the dovetail structure 178 including the tab 184 are inserted into a T-shaped keyhole 186 defined at the bottom of the track 182. The tube holder 150 is then tilted to a parallel position to the track 182 and is able to be slid along the track 182, with the tab 184 preventing the removal of the tube holder 150 from the track 182 (without retilting it to a perpendicular position).

Figure 28:
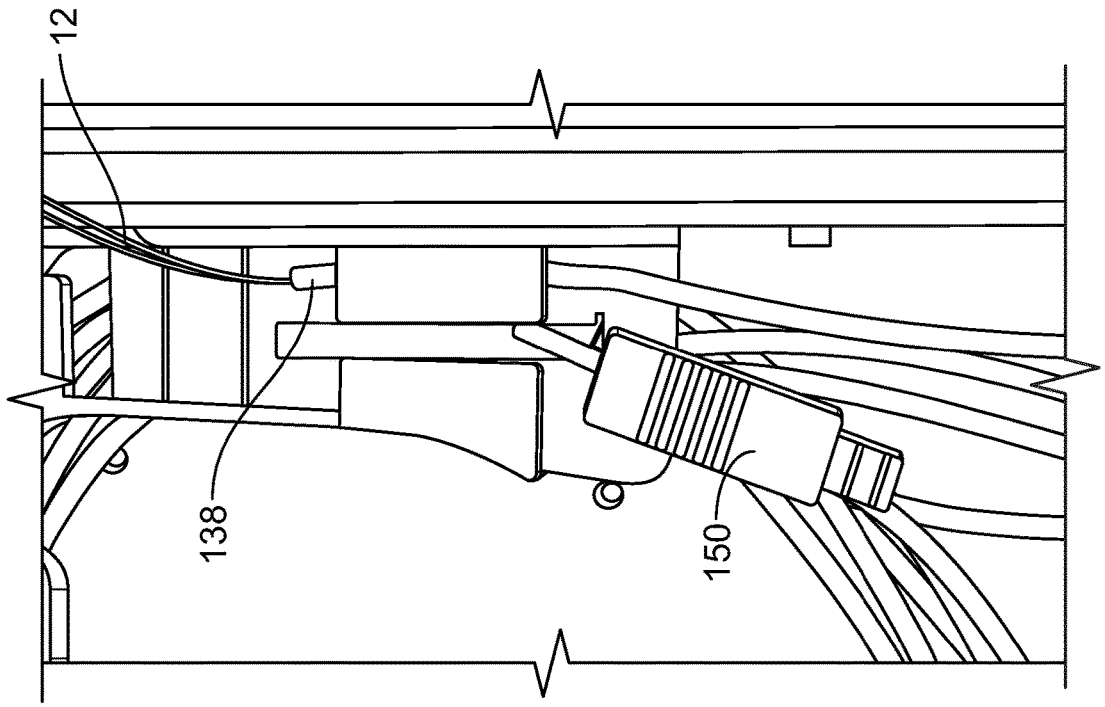
FIG. 28 illustrates the tube of the feeder cable of FIG. 27 placed within the tube holding location.
Figure 27:
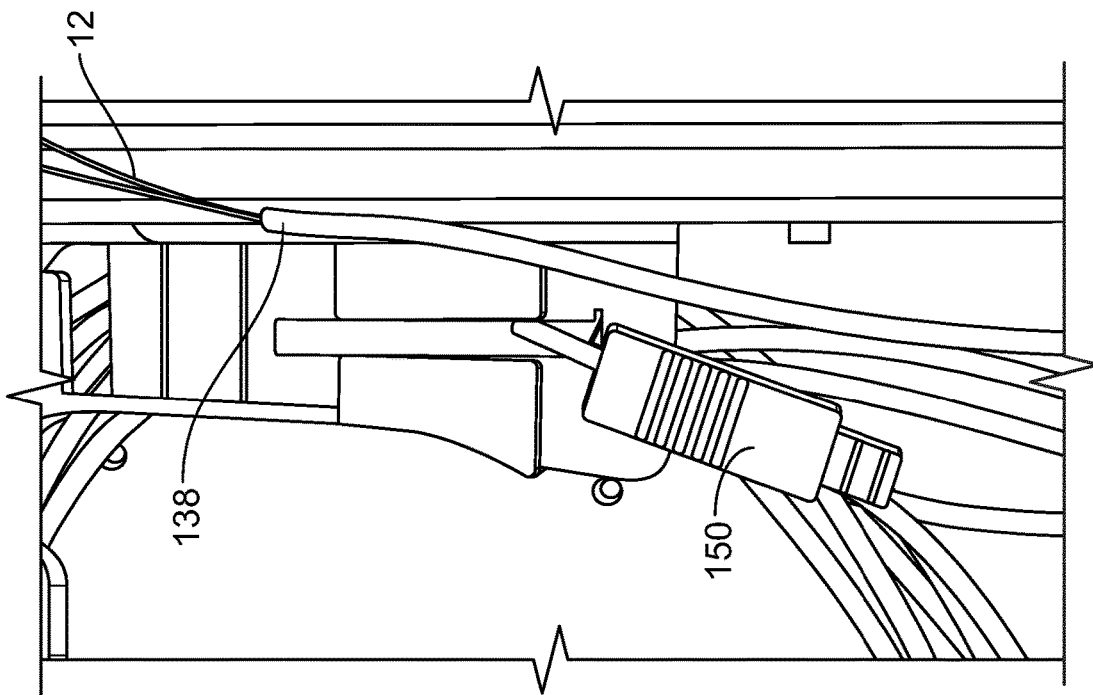
FIG. 27 illustrates the tube holder of the enclosure in a slid-back/access position to allow one of the tubes of a feeder cable to be secured to the enclosure for further processing of the fibers therein.
Figure 30:
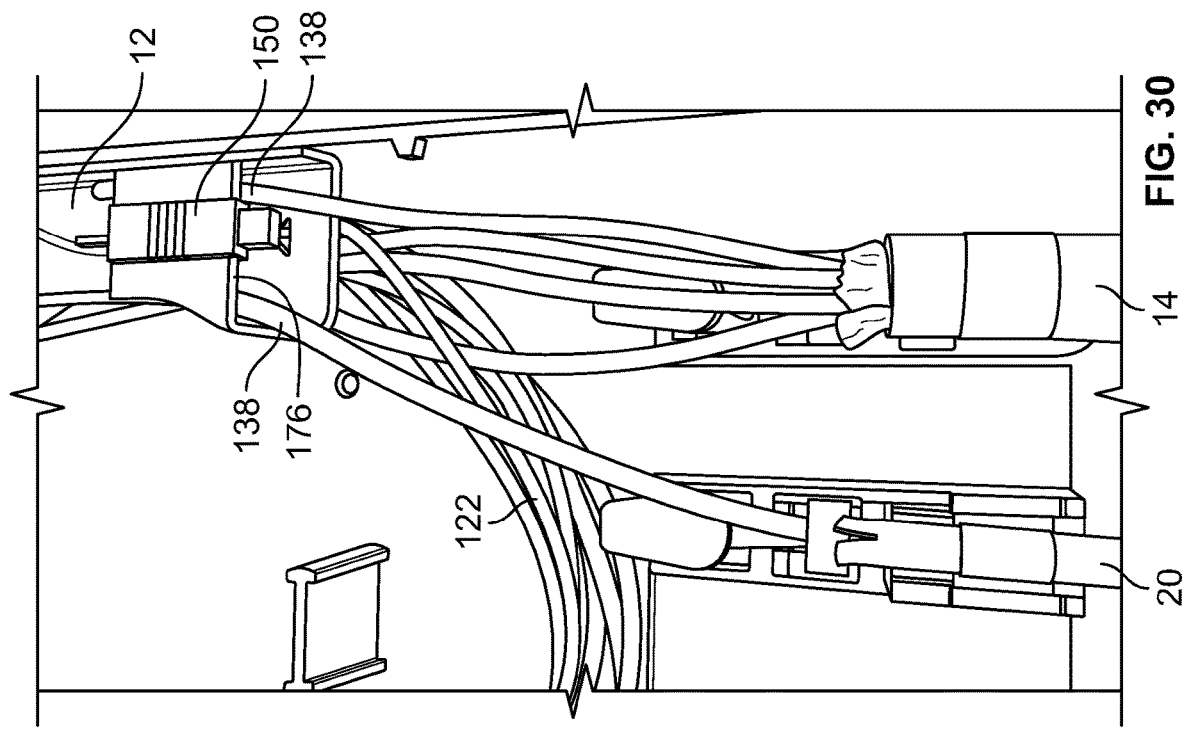
FIG. 30 is a close-up view of the tube holder of FIG. 29 showing the tube holder separating the tube of the feeder cable and the tube of the branch cable.
Figure 29:
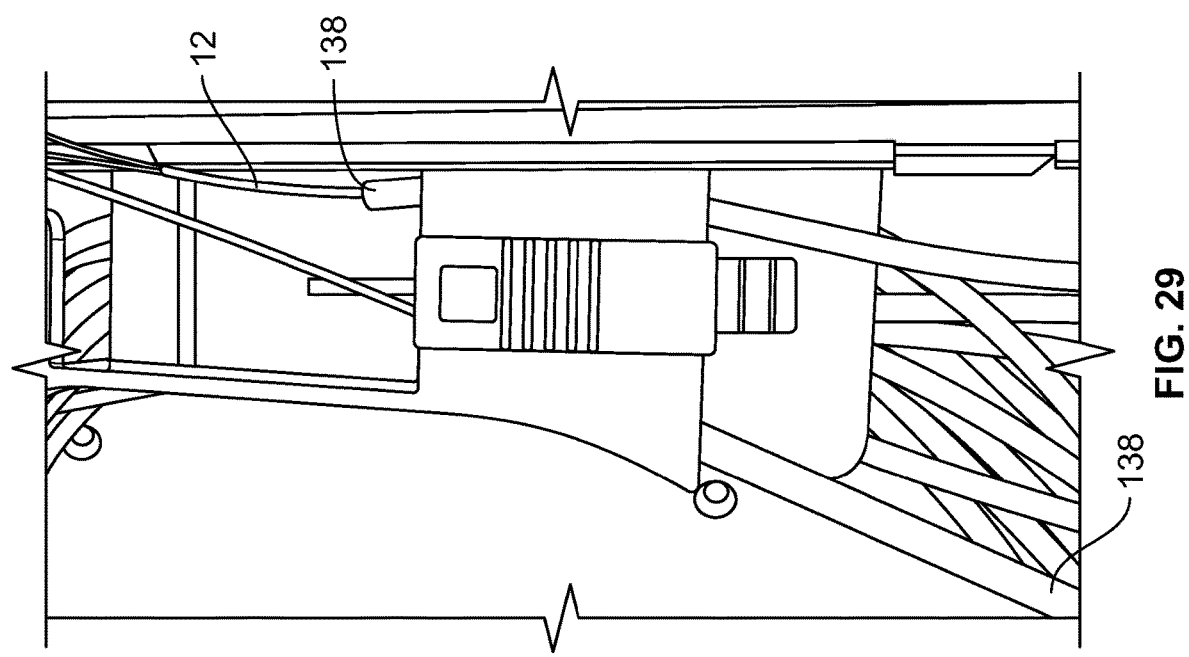
FIG. 29 illustrates the tube holder of FIGS. 27-28 in a closed position with a tube of the feeder cable and a tube of a branch cable separated by the tube holder.

The latch structure 180 is defined by a pair of opposing parallel walls 188 on both sides of the divider 174. The parallel walls 188 define a slot 190 thereinbetween for receiving edges 192 defined by the tube holding location 142. The tube holder 150 rides along the two edges 192 defined by the tube holding location 142 as the tube holder 150 is slidably moved. The latch structure 180 defines latching ribs 194 that mate with ribs 196 defined on the edges 192 for slidably locking the tube holder 150 into place. The edges 192 define a tapered profile that provides a locking feature for the tube holder 150. The latch structure 180 of the tube holder 150 is elastically deflected as the ribs 194 thereof mate with the ribs 196 defined on the edges 192 in locking the tube holder 150 into place. FIGS. 22-26 illustrate the steps in slidably mounting the tube holder 150 to the base 38 of the enclosure 10 for securing the tubes 138 of feeder or branch cables to the enclosure 10. FIG. 27 illustrates the tube holder 150 of the enclosure 10 in a slid-back/access position to allow one of the tubes 138 of a feeder cable 14 to be secured to the enclosure 10 for further processing of the fibers 12 therein. FIG. 28 illustrates the tube 138 of the feeder cable 14 placed within the tube holding location 142. FIG. 29 illustrates the tube holder 150 in a closed position with a tube of the feeder cable 14 and a tube of a branch cable 20 separated by the tube holder 150. FIG. 30 is a close-up view of the tube holder 150, showing the tube holder 150 separating the tube of the feeder cable 14 and the tube of the branch cable 20.

In summary, in the depicted example of the enclosure 10, to connect the feeder fiber 12 to the drop fibers exiting the enclosure, the feeder cable 14 is first routed into the enclosure 10 through one of the input ports 16. One of the feeder fibers 12 is routed from a terminated end of the feeder cable 14 to one of the splice trays 116 carried by the base 38. As noted above, a cable jacket 128 and/or strength member 130 of the feeder cable 14 can be anchored to the base 38 of the enclosure 10. A splitter module 32 can be located at an inner side of the cover 40 of the enclosure 10. Connectorized ends of the output pigtails 28 of the splitter module 32 are plugged into inner ports 64 of optical adapters 26 carried by the cover 40.

When looking in the reverse direction, an unconnectorized end of the splitter input fiber 12 is routed from the cover 40 to one of the splice trays 116 at the base 38. The unconnectorized end of the splitter input fiber 12 is then spliced to the end of the feeder fiber 12 and the splice is stored at the splice tray 116. Then, a connection is finally established between the drop fibers coming from an exterior of the enclosure 10 and the feeder fiber 12 by plugging connectorized ends of the drop fibers into the outer ports 66 of the optical adapters 26.

As discussed previously, the unused tubes 138 from the feeder cable 14 are stored in a loop 122 within a storage pocket 120 underneath the storage tray 118. And, the unused fibers from the selected tube 138 are stored in a looped configuration within the storage tray 118.

Also, as discussed previously, even though the modular elements within the enclosure 10 have been discussed as modules that house optical elements in the form of splitters 34, in other embodiments, the modules 32 may provide straight-through cable routing. In such an arrangement, as shown in FIGS. 33-35, all of the fibers 12 from a feeder cable tube 138 may be spliced at a splice tray 116 to connectorized pigtails 28, which are then routed to a module 32 and managed within the module 32 before leading to the adapters 26 on the cover 40 of the enclosure 10.

Thus, the enclosure 10 is designed to provide a number of alternative connectivity solutions depending on the needs of the network.

The above specification, examples and data provide a complete description of the manufacture and use of the composition of the disclosure. Since many embodiments of the disclosure can be made without departing from the spirit and scope of the disclosure, the inventive features reside in the claims hereinafter appended.

LIST OF REFERENCE NUMERALS AND CORRESPONDING FEATURES

10 Enclosure
12 Feeder/input fiber
14 Feeder cable
16 Input port
18 Interior of enclosure
20 Branch cable
22 Output of enclosure
24 Output port of enclosure
26 Optical adapter
28 Connectorized pigtail
30 Optical device
32 Splitter module
34 Fiber optic splitter
36 Splitter module housing
38 Base
40 Cover
42 Front of enclosure
44 Rear of enclosure
46 Top of enclosure
48 Bottom of enclosure
50 Right side of enclosure
52 Left side of enclosure
54 Mounting flange
56 Fastener opening
58 Enclosure gasket
60 Hinge member
62 Clasp arrangement
64 Inner port of adapter
66 Outer port of adapter
68 Adapter mounting surface
70 Module mounting surface
72 Pocket
74 Cover of splitter module
76 First major surface
78 Second major surface
80 Circumferential edge
82 Interior of splitter module
84 First part
86 Second part
88 Latching tab
90 Recess
92 Optical device mounting region
94 Fiber routing region
96 Fiber inlet opening
98 Outlet opening
100 Anchor
102 Tube
104 Cable management tab
106 Large spool
108 Small spool
110 Catch
112 Protection cover
114 Tab
116 Splice tray
118 Storage tray
120 Pocket
122 Loop
124 Anchoring region
126 Gel block
128 Jacket
130 Strength member
132 Hose clamp
134 Strain relief device
136 Sealing pocket
138 Input tube
140 Passageway
142 Tube holding location
144 Cable management spool
146 Cable management finger
148 Splice area
150 Tube holder
152 Upper right and left corners of storage tray
154 Angled input port
156 Upper edge wall of storage tray
158 Curved transition
160 Left edge wall of storage tray
162 Grow-out zone/area
164 Grow-out zone/area of passageway
166 Right/left wall of passageway
168 Upper wall of passageway
170 Output of splice tray
172 Mounting portion of tube holder
174 Divider portion of tube holder
176 Channel
178 Dovetail structure
180 Latch structure
182 Track
184 Tab
186 T-shaped keyhole
188 Parallel walls
190 Slot
192 Edge
194 Ribs of latching structure
196 Ribs of edge
198 Tube stop

The invention claimed is:

1. An enclosure comprising:
a base defining a splice region;
a removable module disposed within the enclosure, at least one input fiber being routed from the splice region to the removable module;
a cable input location for receiving an input cable that includes at least one tube surrounding at least one fiber that carries the same signal as the at least one input fiber being routed from the splice region to the removable module, the input cable being anchored to the base at the cable input location; and
a tube holder that is slidably mounted to the base past the cable input location, the tube holder configured to keep separate an unused fiber-carrying tube that is stored within the base in a loop from a fiber-carrying tube whose fiber leads toward the splice region of the base for further routing toward the removable module.

2. The enclosure of claim 1, wherein the tube holder is configured with a divider for dividing the cable input location into at least two different channels for keeping two fiber-carrying tubes separate, wherein both fiber-carrying tubes include fibers that lead toward the splice region of the base.

3. The enclosure of claim 2, wherein the two different channels are for keeping a fiber-carrying tube of a feeder cable separate from a fiber-carrying tube of a branch cable.

4. The enclosure of claim 1, further comprising a cover coupled to the base to move between a closed position and an open position, the cover and the base cooperating to define an interior when the cover is in the closed position, the cover providing access to the interior when in the open position, the enclosure further comprising a gasket held between the base and the cover to enable ingress of the input cable and to inhibit ingress of contaminants, wherein the cover is configured to cooperate with the base to activate the gasket.

5. The enclosure of claim 1, wherein each removable module includes a fiber optic splitter for power-splitting the at least one input fiber into a plurality of splitter output pigtails.

6. The enclosure of claim 4, wherein the cover defines a pocket at an inner side, and wherein the removable module is disposed in the pocket.

7. The enclosure of claim 6, further comprising a plurality of ruggedized adapters disposed on the cover, each ruggedized adapter having an inner port accessible from the inner side of the cover and an outer port accessible from an outer side of the cover, wherein the at least one input fiber is output from the removable module as a pigtail having a connectorized end that is connected to the inner port of one of the ruggedized adapters, wherein the ruggedized adapters are disposed on the cover in a plurality of rows, and wherein the pocket is defined between adjacent rows.

8. The enclosure of claim 7, wherein the ruggedized adapters are angled relative to the cover to partially face the cable input location, and wherein the removable module is angled relative to the cover to partially face the cable input location.

9. The enclosure of claim 1, further comprising a second removable module, the second removable module extending parallel to the first removable module.

10. The enclosure of claim 1, wherein the splice region is defined by a flip-tray that is used for splicing the at least one fiber of the input cable to the at least one input fiber that is routed from the splice region to the removable module, the flip-tray defining a cable management portion for routing the at least one fiber of the input cable from the tube holder to the splice region.

11. The enclosure of claim 10, wherein the splice region is defined by two flip-trays that are mounted on the top of each other, each one used for splicing a separate fiber of the input cable to a separate input fiber that is routed from the splice region to the removable module.

12. The enclosure of claim 11, further comprising a storage tray, wherein the storage tray is disposed underneath the flip-trays and is configured to store an unused fiber of the input cable.

13. The enclosure of claim 1, wherein the enclosure includes fiber grow-out zones that are configured to accommodate fiber grow-out resulting from temperature-variation based expansion differences between the at least one fiber and the at least one tube carrying the at least one fiber.

14. The enclosure of claim 13, wherein the grow-out zones are in the form of at least two deflection walls defining a first smaller radius of curvature thereinbetween in combination with a transition section between the at least two deflection walls that defines a second larger radius of curvature for allowing an expansion area for the at least one fiber.

15. The enclosure of claim 4, wherein the removable module is disposed at an inner side of the cover, the enclosure further comprising a protective cover pivotally attached to the cover of the enclosure for protecting the removable module disposed at the inner side of the cover from the base of the enclosure, wherein the at least one input fiber being routed from the splice region of the base to the removable module is also routed under the protective cover.

16. A method of connecting a fiber of an input cable entering a telecommunications enclosure to a drop fiber exiting the enclosure, the method comprising:
routing the input cable into the enclosure having a base and a pivotable cover;
separating a tube of the input cable that carries a fiber to be processed within the enclosure from unused tubes of the input cable using a slidably movable tube holder;
storing the unused tubes of the input cable in a loop within the enclosure;
routing the fiber to a splice tray within the enclosure carried by the base;
splicing the fiber to a second fiber within the splice tray and routing the second fiber to a removable module that is positioned within the enclosure; and
outputting the second fiber from the removable module.

17. The method according to claim 16, further comprising power-splitting the second fiber to a plurality of fibers output from the removable module as connectorized pigtails.

18. The method according to claim 16, further comprising using the tube holder to keep a tube of the input cable in the form of a feeder cable separate from a tube of a second input cable in the form of a branch cable.

19. The method according to claim 16, further comprising activating a sealing arrangement by moving a cover of the enclosure relative to a base of the enclosure to a closed position.

20. The method according to claim 16, further comprising mounting the enclosure to a vertical surface using mounting flanges of the enclosure.

* * * * *

UNITED STATES PATENT AND TRADEMARK OFFICE
CERTIFICATE OF CORRECTION

PATENT NO. : 10,866,377 B2
APPLICATION NO. : 16/515296
DATED : December 15, 2020
INVENTOR(S) : Bart Mattie Claessens It is certified that error appears in the above-identified patent and that said Letters Patent is hereby corrected as shown below:

In the Claims

Column 15, Lines 9-10, Claim 2: "toward the splice region of the base." should read --toward the splice region.--

Column 16, Lines 31-32, Claim 16: "into the enclosure having a base and a pivotable cover;" should read --into the enclosure;--

Column 16, Lines 38-39, Claim 16: "within the enclosure carried by the base;" should read --within the enclosure;--

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*